United States Patent
Abdallah

(10) Patent No.: US 9,948,368 B2
(45) Date of Patent: Apr. 17, 2018

(54) PROACTIVE MIMO RELAYING IN WIRELESS COMMUNICATIONS

(71) Applicant: SONY CORPORATION, Tokyo (JP)

(72) Inventor: Ramy Medhat Abdallah, San Jose, CA (US)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/142,822

(22) Filed: Apr. 29, 2016

(65) Prior Publication Data

US 2017/0317726 A1   Nov. 2, 2017

(51) Int. Cl.
| | |
|---|---|
| *H04B 7/06* | (2006.01) |
| *H04W 84/12* | (2009.01) |
| *H04B 17/318* | (2015.01) |
| *H04B 7/0452* | (2017.01) |
| *H04B 17/336* | (2015.01) |

(52) U.S. Cl.
CPC ......... *H04B 7/0452* (2013.01); *H04B 7/0617* (2013.01); *H04B 7/0626* (2013.01); *H04B 17/318* (2015.01); *H04B 17/336* (2015.01); *H04W 84/12* (2013.01)

(58) Field of Classification Search
CPC ..... H04W 88/04; H04W 40/22; H04W 52/46; H04B 7/14; H04B 7/026
See application file for complete search history.

(56) References Cited

U.S. PATENT DOCUMENTS

| 8,149,806 B2 | 4/2012 | Kesselman et al. |
| 8,989,078 B2 | 3/2015 | Kwon et al. |
| 9,332,554 B1 * | 5/2016 | Heidari ................. H04B 7/0456 |

(Continued)

FOREIGN PATENT DOCUMENTS

| WO | 2010016831 A1 | 2/2010 |
| WO | 2014153233 A1 | 9/2014 |
| WO | 2014153237 A1 | 9/2014 |

OTHER PUBLICATIONS

Baykas, T. et al., "Investigation of Synchronization Frame Transmission in Multi-Gbps 60 GHz WPANs", Proceedings of the 2010 IEEE Wireless Communication and Networking Conference, Sydney, NSW, Apr. 18-21, 2010, pp. 1-6.

Niu, Y., et al. "A Survey of Millimeter Wave (mmWave) Communications for 5G: Opportunities and Challenges", Cornell University Library, arXiv:1502.07228v1, Feb. 25, 2015, pp. 1-17.

(Continued)

*Primary Examiner* — Aristocratis Fotakis
(74) *Attorney, Agent, or Firm* — O'Banion & Ritchey LLP; John P. O'Banion

(57) ABSTRACT

A wireless communication system with directional transmission for simultaneously relaying communications between an access point (AP) and multiple radio nodes in the network which are in a first category that supports multiple-input-multiple-output (MIMO) capability, or a second category having different signal processing capabilities. Utilizing a superframe, which is a modification of an existing protocol, a relaying service period (SP) controls multiple simultaneous training and data transmission frames. The AP selects a relay device from the radio nodes based on metrics selected from signal strength, estimation of air time, category of radio node, AoA/AoD, power connectivity. This allows data to be communicated in a MIMO hop from said AP to the selected relay device, with a multi-user (MU) MIMO hop from the selected relay device and a destination radio node (client).

20 Claims, 21 Drawing Sheets

| IE ID | length | MCS rates | max # of streams | polarization | MU-MIMO | beam combining | MIMO training | MU-MIMO training |

MIMO Info field format

(56) References Cited

U.S. PATENT DOCUMENTS

| | | | | |
|---|---|---|---|---|
| 9,788,263 | B1* | 10/2017 | Amiri | H04W 48/16 |
| 2008/0318520 | A1 | 12/2008 | Kwun et al. | |
| 2009/0116422 | A1* | 5/2009 | Chong | H04B 7/026 |
| | | | | 370/315 |
| 2012/0135677 | A1* | 5/2012 | Hsu | H04B 7/15507 |
| | | | | 455/11.1 |
| 2012/0230247 | A1* | 9/2012 | Kwon | H04B 7/022 |
| | | | | 370/315 |
| 2012/0314609 | A1* | 12/2012 | Chang | H04B 7/15592 |
| | | | | 370/252 |
| 2013/0003689 | A1* | 1/2013 | Kwon | H04W 28/16 |
| | | | | 370/329 |
| 2013/0114500 | A1* | 5/2013 | Liu | H04B 7/024 |
| | | | | 370/315 |
| 2015/0264628 | A1* | 9/2015 | Wen | H04W 40/22 |
| | | | | 370/315 |
| 2016/0360489 | A1* | 12/2016 | Boodannavar | H04B 7/0413 |
| 2017/0033858 | A1* | 2/2017 | Calcev | H04B 7/14 |
| 2017/0156066 | A1* | 6/2017 | Shiotani | H04B 17/318 |

OTHER PUBLICATIONS

European Patent Office (EPO), International Search Report and Written Opinion dated Sep. 25, 2017, related PCT international application No. PCT/US2017/028827, pp. 1-18, with claims searched, pp. 19-25.

Okeke, Godfrey O. et al., "A Novel Low-Complexity Joint User-Relay Selection and Association for Multi-User Multi-Relay MIMO Uplink", IEEE Wireless Communications Letters, vol. 4, No. 3, Jun. 2015, published Mar. 10, 2015, pp. 309-312.

Takizawa, Shinya et al., "Routing Control Scheme Prolonging Network Lifetime in a 6LoWPAN WSN with Power-supplied and Battery-powered Nodes", The 9th Annual Consumer Communications and Networking Conference—Special Session on Ecological and Smart Home Network, IEEE, Jan. 14, 2012, pp. 285-289.

Zhang, Chao et al., "A Simple Distributed Relay-Assignment Algorithm for Multi-Antenna Relay Networks", Third International Conference Communications and Networking in China (Chinacom 2008), IEEE, Aug. 25, 2008, pp. 293-397.

* cited by examiner

No Interference

Interference

FIG. 12
(Prior Art)
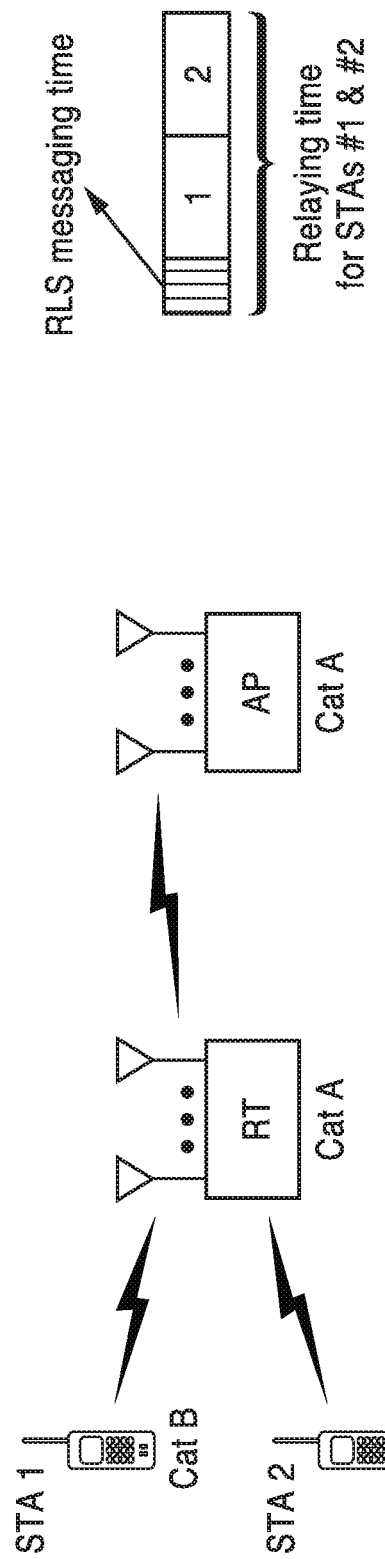
FIG. 13A
FIG. 13B

MIMO Info field format

PROACTIVE MIMO RELAYING IN WIRELESS COMMUNICATIONS

CROSS-REFERENCE TO RELATED APPLICATIONS

Not Applicable

STATEMENT REGARDING FEDERALLY SPONSORED RESEARCH OR DEVELOPMENT

Not Applicable

INCORPORATION-BY-REFERENCE OF COMPUTER PROGRAM APPENDIX

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technical Field

The technology of this disclosure pertains generally to wireless network communication, and more particularly to the use of Multiple Input-Multiple Output (MIMO) relaying in wireless communications, including the 802.11 standard.

2. Background Discussion

Wireless communications have becoming increasingly important in recent years. One of these forms of wireless communication is millimeter wave (mmWave) communications which occur at very high frequencies (30-300 GHz), and offers a large spectrum bandwidth. This bandwidth is especially useful for high data rate wireless applications, such as UHD (Ultra-High Definition) video streaming. It should be noted that there is around 14 GHz of unlicensed spectrum that is available globally in the 60 GHz band.

Due to wavelengths on the order of a few millimeters, large numbers of antennas, also known as phased arrays, can be implemented in a small area for a mmWave radio.

FIG. 1 illustrates 10 an example 256 element antenna array for mmWave communication, which is shown in the figure compared to a coin, (diameter 0.955 inches or 24.26 mm).

These ultra high frequency antenna arrays are small and highly directive, wherein a technique known as beamforming is utilized to take advantage of the large number of antennas for steering transmission towards a desired radio direction.

FIG. 2 depicts a simple beamforming example 30, showing a beam select signal 32 received by a beam selector 34 coupled to a base 36 of a beamformer having antennas 38a, 38b, 38c through 38n. Signal strength lobes 40a, 40b, 40c and 40d are shown (at exaggerated angles) associated with each antenna. However, link budget (a quantification of link performance) for these arrangements is poor for a number of reasons, including, high free space path loss (FSPL) and large $O_2/H_2O$ absorption, and large attenuation by objects.

FIG. 3 depicts a plot of expected atmospheric losses in relation to operating frequency. Utilizing beamforming in this high signal attenuation environment creates less interference between communication links.

FIG. 4A and FIG. 4B compare the lack of interference between narrow antenna patterns in FIG. 4A as a result of beamforming with the interference that arises from the use of wider patterns as seen in FIG. 4B. The upper triangle shape on each depicts a receiver antenna pattern, with the lower triangle shape being the antenna pattern of a potential interferer.

Even with the use of antenna arrays, mmWave systems have a poor link budget which makes it difficult to cover a WLAN area without dead spots, which detracts from the user experience. In view of the above, in mmWave systems the Access Point (AP) cannot reliably communicate directly with some of the Stations (STAs).

FIG. 5 shows a multi-hop relay configuration with communication between Node A and Node B through a Relay. Utilizing wireless relaying is a technique directed at trying to overcome poor link budget at mmWave frequencies.

While relaying can improve coverage it incurs a throughput penalty compared to the use of a direct link. This penalty can arise from (a) transmission of data in two (or more) hops, as well as (b) overhead incurred from management frames and channel measurements required for the relay link setup (RLS).

FIG. 6A illustrates a simple 3 node relay example between an Access Point (AP) and Node A, Node B, and Node C through a Relay. In FIG. 6B is depicted an example of air time utilization showing each of the 6 links (1-6) with RLS overhead for links 1-2, 3-4 and 5-6 respectively.

Accordingly, it will be appreciated that present techniques for using relays in mmWave communications involve significant penalties and difficulties. The present disclosure overcomes these shortcomings while providing additional benefits.

BRIEF SUMMARY

Single user (SU) multiple input multiple output (MIMO) technology is currently widely used in WLAN technologies at 2.4 GHz (e.g., 802.11n) and 5 GHz (e.g., 802.11ac) as well as 4G cellular technologies. However, MIMO technology has not yet been introduced into mmWave standards or products at this time. The disclosed apparatus envisions the use of MIMO and multi-user (MU)-MIMO, having data streams multiplexed from/to different clients, being implemented into mmWave communications once a few of the current drawbacks are addressed.

When wireless communications adopt MIMO technology in wireless radio nodes, then two device categories (having different signal processing capabilities with respect to node to node communications) may be available in a given communication system (e.g., WLAN), for example (first category) Category A (Cat A) and (second category) Category B (Cat B). Cat A provides a device with complex circuitry, high antenna gain, and supporting data multiplexing (MIMO) of dimension M, M≥2. Typically a Cat A device would be stationary. Cat B provides a device with simple circuitry, low antenna gain, and which is capable of processing N data streams, N=1 (Single Input-Single Output (SISO)) or N<M. Cat B devices are more likely mobile. It should be noted that SISO is a specific case of Cat B, which are less capable than Cat A. By way of example and not limitation, Cat A can support MIMO with four independent chains for data communications while Cat B can support only two or can be with one chain (SISO).

A wireless communication system that does not utilize MIMO capability in relaying communication will suffer from a multi-hopping throughput penalty for each STA that needs assistance for communications by a relay.

By utilizing MIMO at the relay terminal, multiplexing of data from multiple STAs can minimize the time spent in multi-hopping and RLS setup overhead. This air-time reduction translates into improving achieved throughput. This wireless communications apparatus/method is configured for relaying multiple data streams simultaneously from a group of Cat B STAs to a Cat A relay and then the streams are multiplexed to a Cat A AP.

A spectrally-efficient coverage extension architecture is provided which takes advantage of MIMO capability in relaying. This architecture in its abstract form is a MIMO hop from the access point (AP) to the relay node followed by a multi-user (MU)-MIMO hop from the relay node to the wireless clients. Furthermore, efficient and proactive methods are taught for relay selection and relay link setup (RLS). By way of example and not limitation, the apparatus/method can be utilized to provide a full coverage wireless experience by extending wireless coverage, for example around a house (or other structure), for instance by setting up a relay at a location that covers the backyard of the house (an adjacent area in/near the structure).

A number of terms are utilized in the disclosure whose meanings are generally utilized as described below.

AID: Association Identifier is utilized whenever a station associates to an AP (or central radio coordinator), the station receives an AID. The AP (or central radio coordinator) uses this AID to keep track of the stations that are associated and the members of the BSS.

AP: Access Point is an entity that contains one station (STA) and provides access to distribution services, via the wireless medium (WM) for associated STAs.

AoA (AoD): Angle of Arrival (Angle of Departure) in which the direction of propagation of a radio-frequency wave incident (transmitted) on (from) an antenna array.

A-BFT: Association-BeamForming Training period is a period announced in the beacons that is used for association and BF training of new stations joining the network.

Beamforming (BF) is a process of phasing antennas within an array to achieve directional transmission (form a beam) that does not use an omnidirectional antenna pattern or quasi-omni antenna pattern. It is used at a transmitter to improve the received signal power or signal-to-noise ratio (SNR) at an intended receiver.

Beam combining is a method of combining power contained in various beams at the receiver for each independent data stream.

BSS: basic service set is a set of stations (STAs) that have successfully synchronized with an AP in the network.

BI: Beacon Interval is a cyclic superframe period that represents the time between beacon transmission times.

BRP: BF Refinement Protocol. A BF refinement protocol enables receiver training and iteratively trains the transmitter and receiver sides to achieve the best possible directional communications.

CBAP: Contention-Based Access Period. The time period within the data transfer interval (DTI) of a directional multi-gigabit (DMG) BSS where contention-based enhanced distributed channel access (EDCA) is used.

DTI: Data Transfer Interval is the period whereby full BF training is permitted followed by actual data transfer. It can include one or more service periods (SPs) and contention-based access periods (CBAPs).

MAC address: Medium Access Control (MAC) address.

MCS: Modulation and Coding Scheme is an index that can be translated into the PHY layer data rate.

MIMO: Multiple Input Multiple Output is a communications between two devices that simultaneously utilizes multiple streams of data.

MU-MIMO: Multi-User Multiple Input Multiple Output are communications between a device and two or more nodes with single or multiple streams of data per node.

Omni directional: A non-directional antenna mode of transmission.

Quasi-omni directional: A directional multi-gigabit (DMG) antenna operating mode with the widest beamwidth attainable.

Relay: The 802.11 DMG relay function allows a source relay endpoint DMG STA (REDS) to transmit frames to a destination REDS with the assistance of another DMG STA (the relay).

RDS: Relay DMG Station (RDS).

RSSI: Receive Signal Strength Indicator (in dBm) is a measure of signal strength.

SISO: Single Input Single Output is a communication between two devices between which is a single stream of data.

SNR: Signal-to-Noise-Ratio is a quality measure of a connection measuring the ratio between the signal of interest and noise signals as measure in dB.

SP: Service Period is scheduled by the access point (AP). Scheduled SPs start at fixed intervals of time.

Spectral efficiency: The information rate that can be transmitted over a given bandwidth in a specific communication system, usually expressed in bits/sec/Hz.

STA: Station is a logical entity that is a singly addressable instance of a medium access control (MAC) and physical layer (PHY) interface to the wireless medium (WM).

Further aspects of the technology described herein will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWING(S)

The technology described herein will be more fully understood by reference to the following drawings which are for illustrative purposes only:

FIG. 12 is a data field format diagram for channel measurement information.

FIG. 13A and FIG. 13B are a radio node diagram and air time segment for relaying between a Cat A AP, a Cat A RT and STA 1 and STA 2 that are both Cat B according to an embodiment of the present disclosure.

DETAILED DESCRIPTION

A wireless communication system (e.g., mmWave WLAN) is described for relaying data simultaneously to/from multiple communications devices utilizing MIMO capability in relaying. The architecture takes advantage of using a MIMO hop from a central coordinator, typically the access point (AP), to the relay node followed by a multi-user (MU)-MIMO hop from the relay node to the wireless clients. Efficient and proactive methods are described for relay selection and relay link setup (RLS).

1. State of the Art mmWave Technology.

Prior to describing details of the disclosed system, it will be instructive to understand some aspects regarding state of the art mmWave WLAN systems, such as under the 802.11ad standard. It should be appreciated that in this standard MIMO capability is not utilized, no mmWave MIMO relays are utilized, and no multi-user (MU) MIMO communications are utilized. Different device categories are not even present.

The relaying process under the 802.11ad standard is a complicated process, which is envisioned only for temporary link interruptions or blockage. Relaying is provided as a source driven process after failures in communication arise with the destination. Using the relay requires scheduling communications between source, each candidate relay STA in the BSS, and the destination prior to selecting the relay terminal. Thus, relay selection consumes considerable messaging overhead and requires significant time. It is unlikely that this mechanism would provide significant help in the majority of dynamic channel interruption conditions.

The metrics used in the 802.11ad standard are based on channel measurements and the relay selection logic is not specified, it is left open for implementation.

Figure 1:
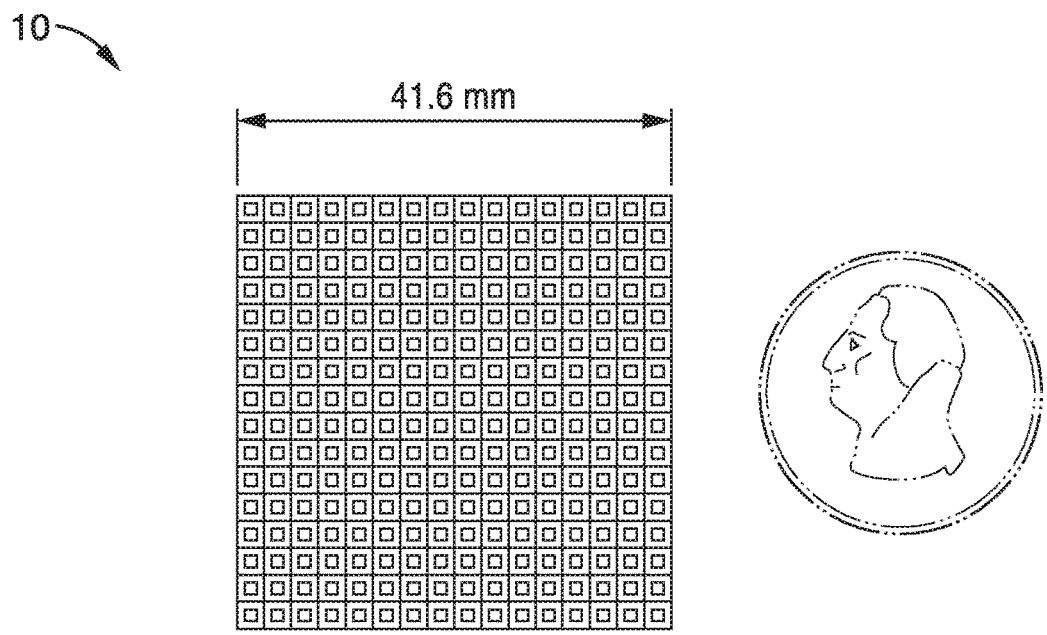
FIG. 1 is an image rendition of a 256 element antenna array chip for use with mmWave communications.
Figure 2:
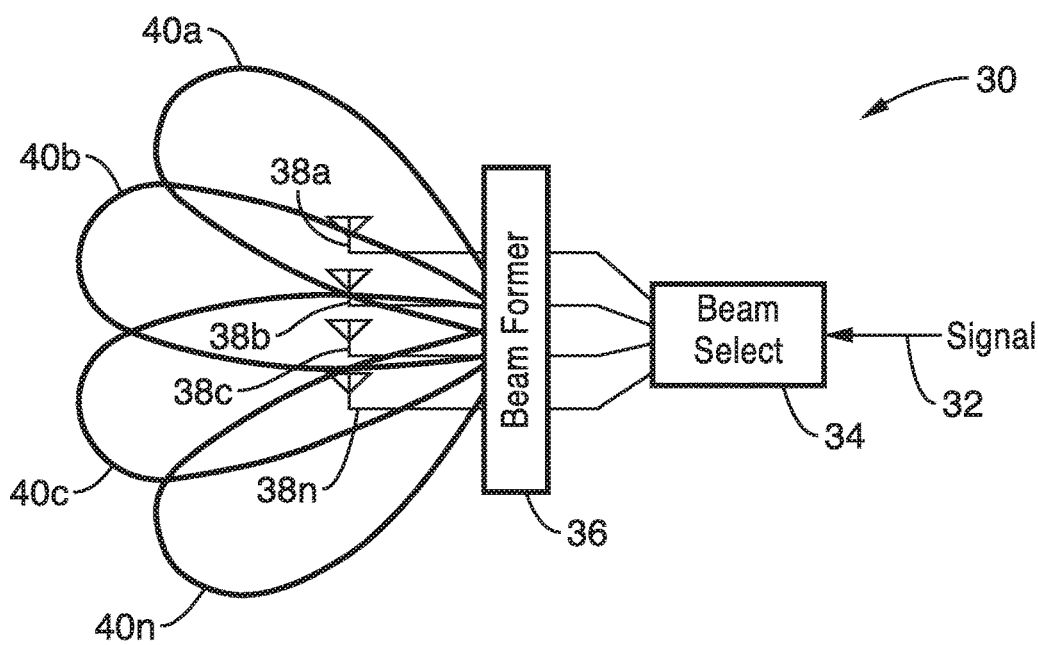
FIG. 2 is a diagram of a beamforming antenna as used with mmWave communications systems.
Figure 3:
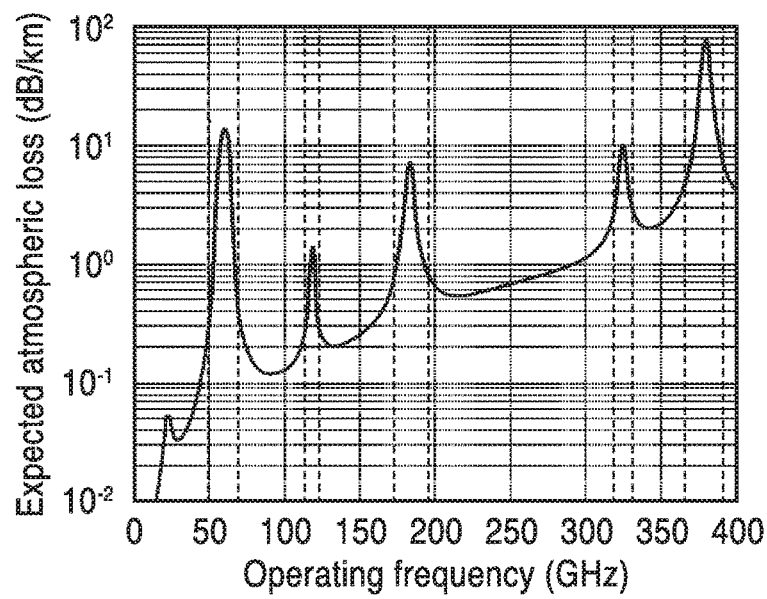
FIG. 3 is a plot of atmospheric attenuation for mmWave signals, as a contributor to its poor link budget.
Figure 4A:
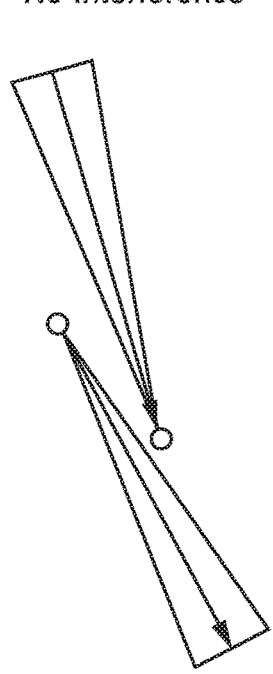
FIG. 4A and FIG. 4B are signal path diagrams illustrating a higher interference probability arises in response to use of a wider angle antenna system.
Figure 4B:
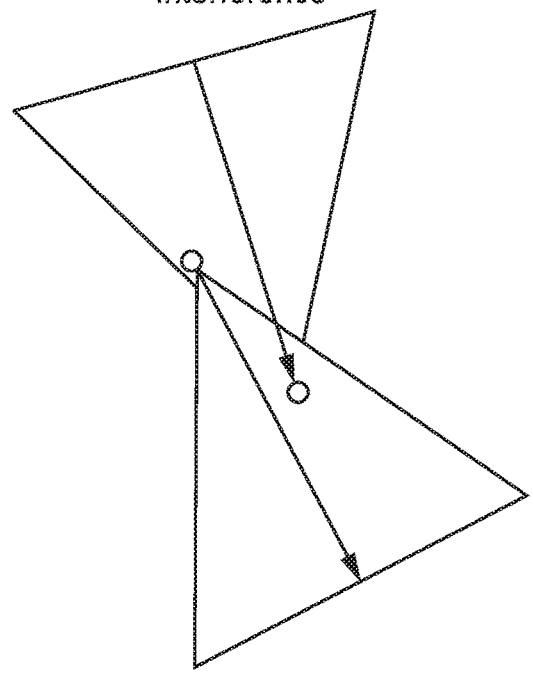
Figure 5:
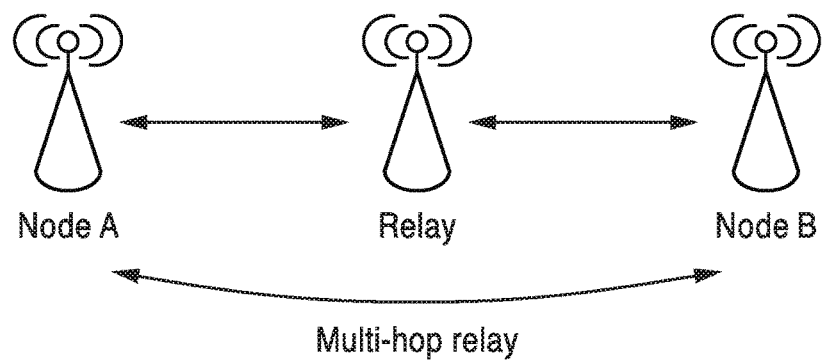
FIG. 5 is a radio node diagram of a multi-hop relay used for communicating between a Node A and a Node B.
Figure 6A:
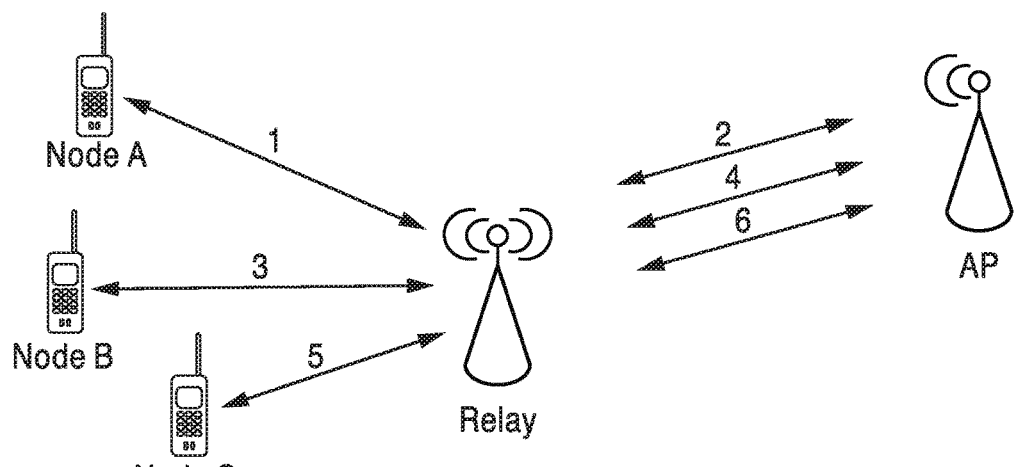
FIG. 6A and FIG. 6B are a radio node diagram and an air time segment for access channels in the communication stream for a multi-hop communication using a relay between an access point (AP) and Nodes A, B, and C.
Figure 6B:
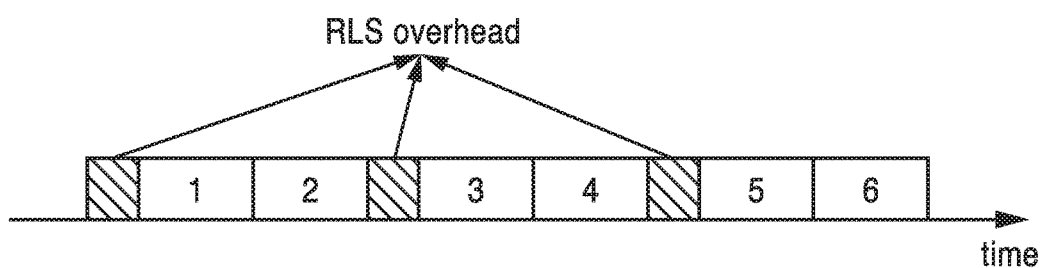
Figure 7A:
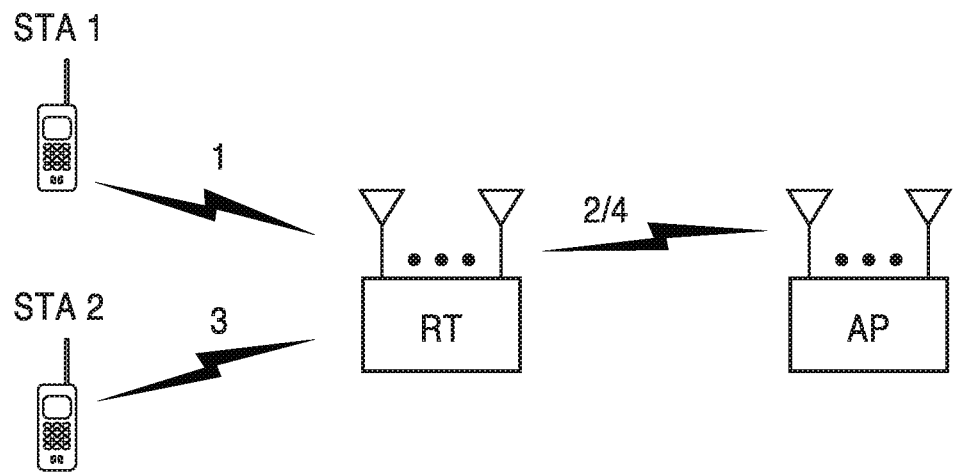
FIG. 7A and FIG. 7B are a radio node diagram and air time segment in the communications stream between an access point (AP) through a relay terminal (RT) to STA 1 and to STA 2.
Figure 7B:
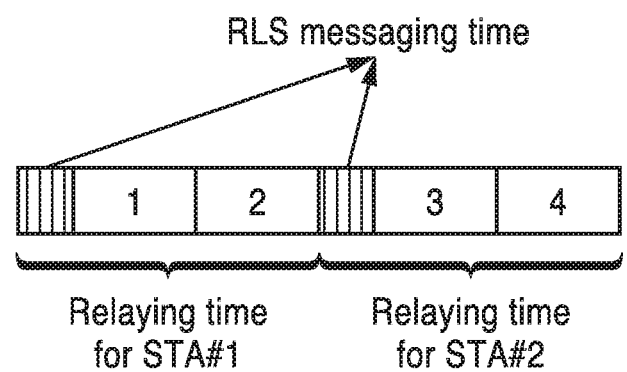

FIG. 7A and FIG. 7B depict a state of the art WLAN system and an associated air time segment. In the depicted WLAN system, a relay terminal (RT) forwards the data from a station (STA) (STA 1 or STA 2) to an AP in two-hops. It should be appreciated that a 'hop' is understood to be a communication (or communication path) between two nodes which form a portion of the communication path between a transmitter and a receiver. The MIMO capability of a relay terminal and the AP are not utilized in these hops.

In FIG. 7B, time slots 1 and 2 represent WLAN air time that is consumed for data relaying from STA 1 to AP. Slots 3 and 4 are similarly consumed for relaying data from STA 2 to the AP. Moreover, each source STA initiates and performs a relay link setup (RLS) individually with the help of the AP. Hence, each STA requires two time slots to transfer information to the AP and similarly requires two time slots in the reverse direction from AP to each STA.

Figure 8:
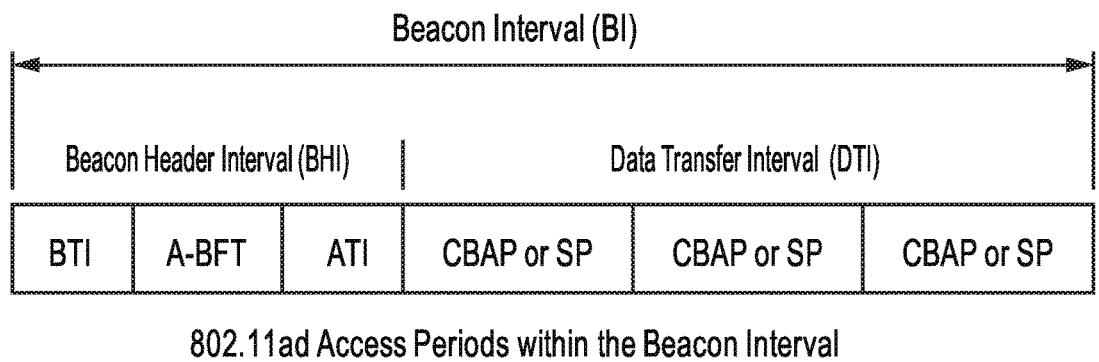
FIG. 8 is a data field format of a beacon interval showing beacon header and data transfer intervals.

FIG. 8 depicts a 802.11ad superframe data field structure, which is a cyclic structure whose duration is called a "Beacon Interval" (BI), which is typically chosen to be 100 ms. The BI is shown consisting of a Beacon Header Interval (BHI) and a Data Transfer Interval (DTI). The BHI consists of up to three access periods. (1) A Beacon Transmission Interval (BTI) comprises beacon frames, transmitted by the AP. BTI is utilized for network announcement and as a first stage for beamforming training of the AP antenna sectors. (2) Association Beamforming Training (A-BFT) is utilized by AP and stations to train their antenna sectors. (3) Announcement Transmission Interval (ATI) is an interval during which the AP exchanges management information with stations which are already associated to the network and have performed beamforming training.

The DTI comprises one or more contention-based access periods (CBAPs) and scheduled service periods (SPs) where stations exchange data frames. The data rate modulation and coding set (MCS), and most typically MCS 0, is used for communication during BTI and A-BFT to increase range, while communication during the ATI and the following DTI, takes place with higher MCSs with beamformed communications that improve efficiency.

Figure 9:
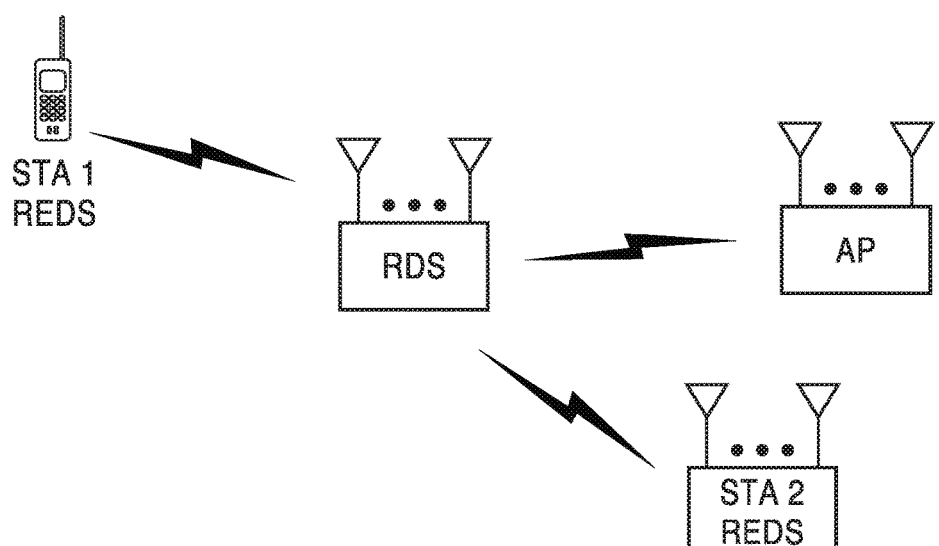
FIG. 9 is a radio node diagram of a 802.11ad relay network topology, showing an AP communicating through a Relay DMG Station (RDS) with a STA 1 and STA 2.

FIG. 9 depicts a state of the art WLAN system in which two source STAs are allowed to communicate directly, or with the help of a relay, such as to and from an AP. In this case the source and destination STAs are participating in a relay link system (RLS) which are termed source relay endpoint DMG STA (REDS). The relay terminal is thus termed relay DMG STA (RDS). The term DMG stands for Directional Multi Gigabit Relaying. Conventional relaying in 802.11ad is utilized to improve the reliability of communication in case the direct link between the source REDS and the destination REDS is disrupted.

Figure 10A:
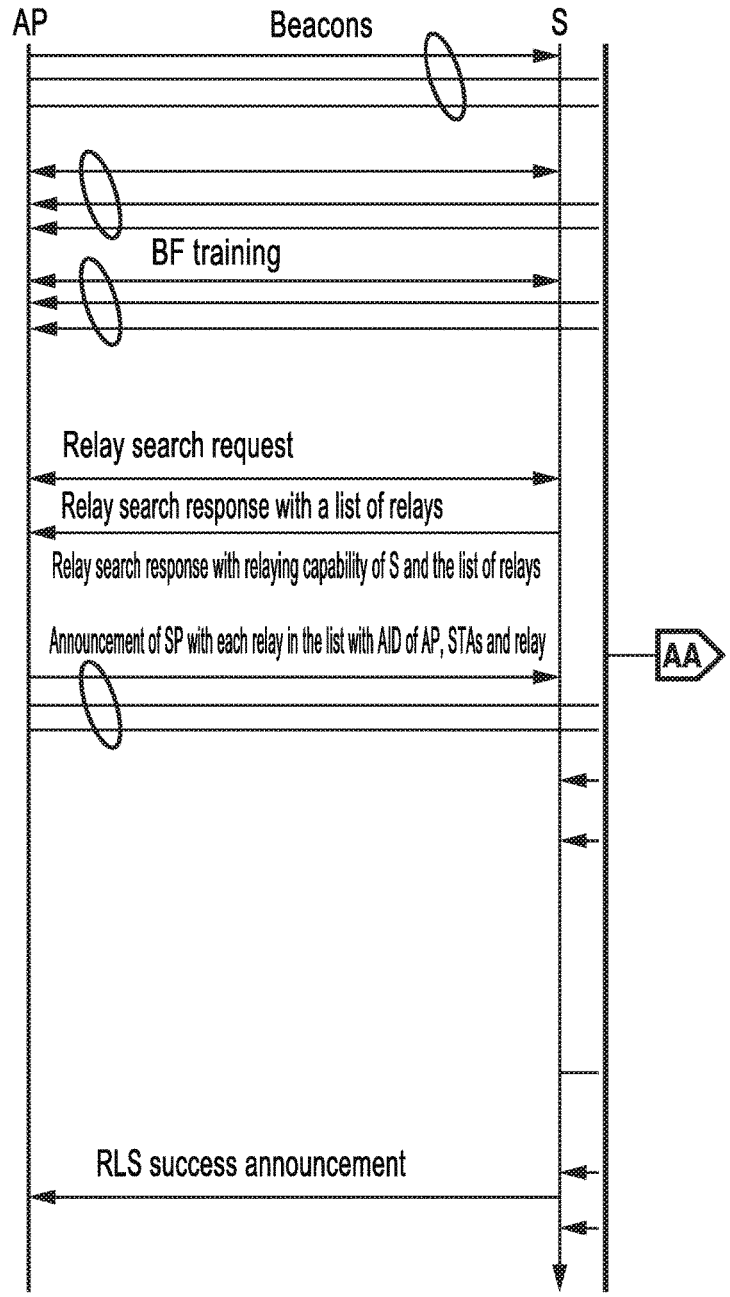
FIG. 10A and FIG. 10B is a message sequence for relaying data as utilized in 802.11ad.
Figure 10B:
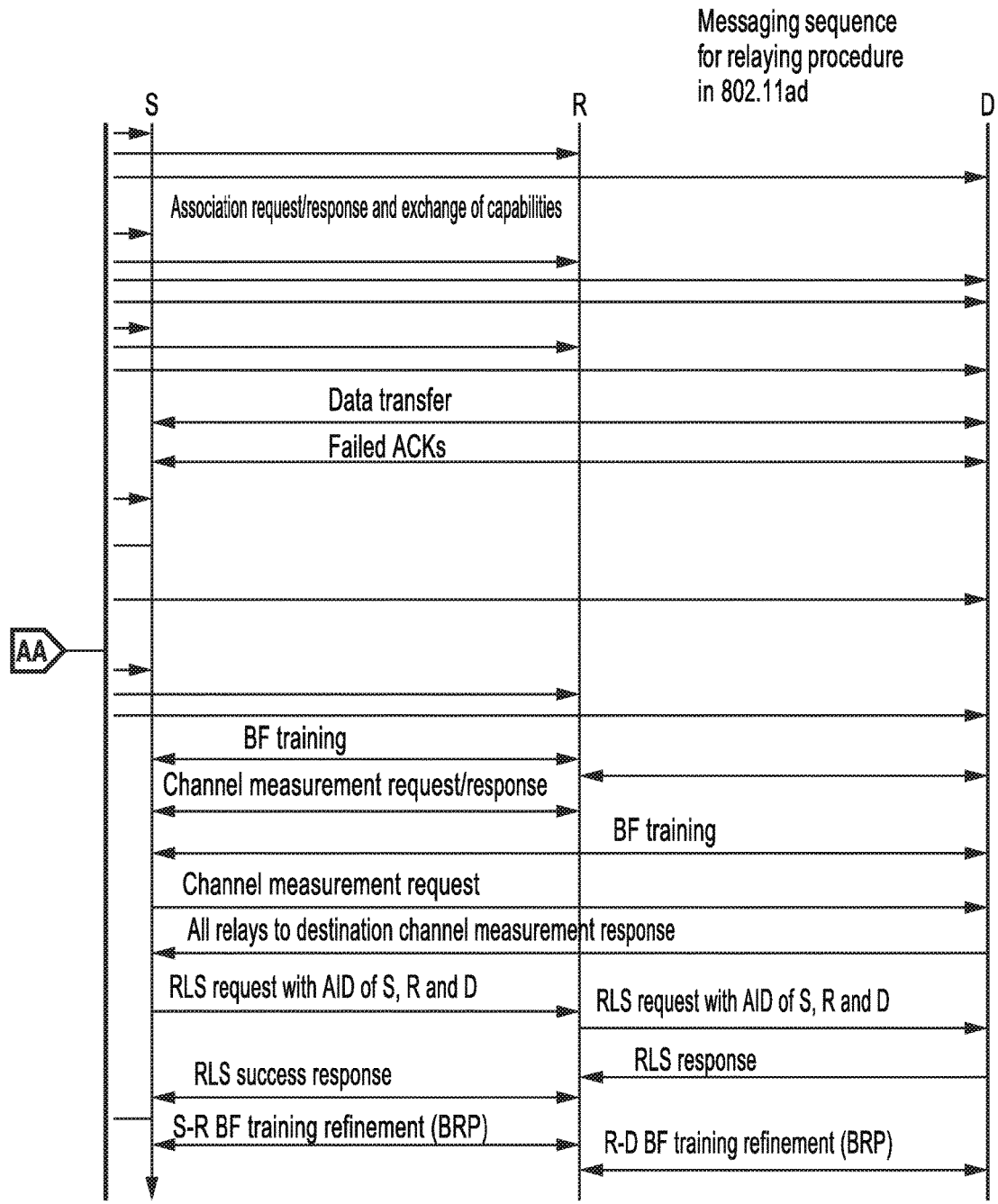

FIG. 10A and FIG. 10B depict an example messaging sequence for the relaying procedure in 802.11ad. In the far left column (FIG. 10A) is seen the high level description of the steps, including "Beacons and BF bootstrapping" at the top, followed by "Association", "Exchange of Capabilities", and "Beamforming Training". In the third section down on the left one sees the general steps of "Direct (no relaying) link Data Transfer", "Source Initiates Relaying", and "Relay Discovery". The bottom left section contains the general steps of "Collection of Channel Measurement Reports from all Relays and the Destination at the Source", followed by "Relay Selection", "RLS Procedure", and finally "BF Training Refinement".

The right portion of the message sequence diagram (FIG. 10B) depicts messages between the access point (AP), source REDS (S), relay RDS (R), and destination REDS (D). The ovals depicted surrounding groups of messages indicate related operations, such as at the top beacons are sent to each of the STAs, shown as STA 1, STA 2, and STA 3. From looking at the message traffic on the right side of this diagram one can get an idea of the amount of messaging that is required to support this relaying procedure.

Figure 11:
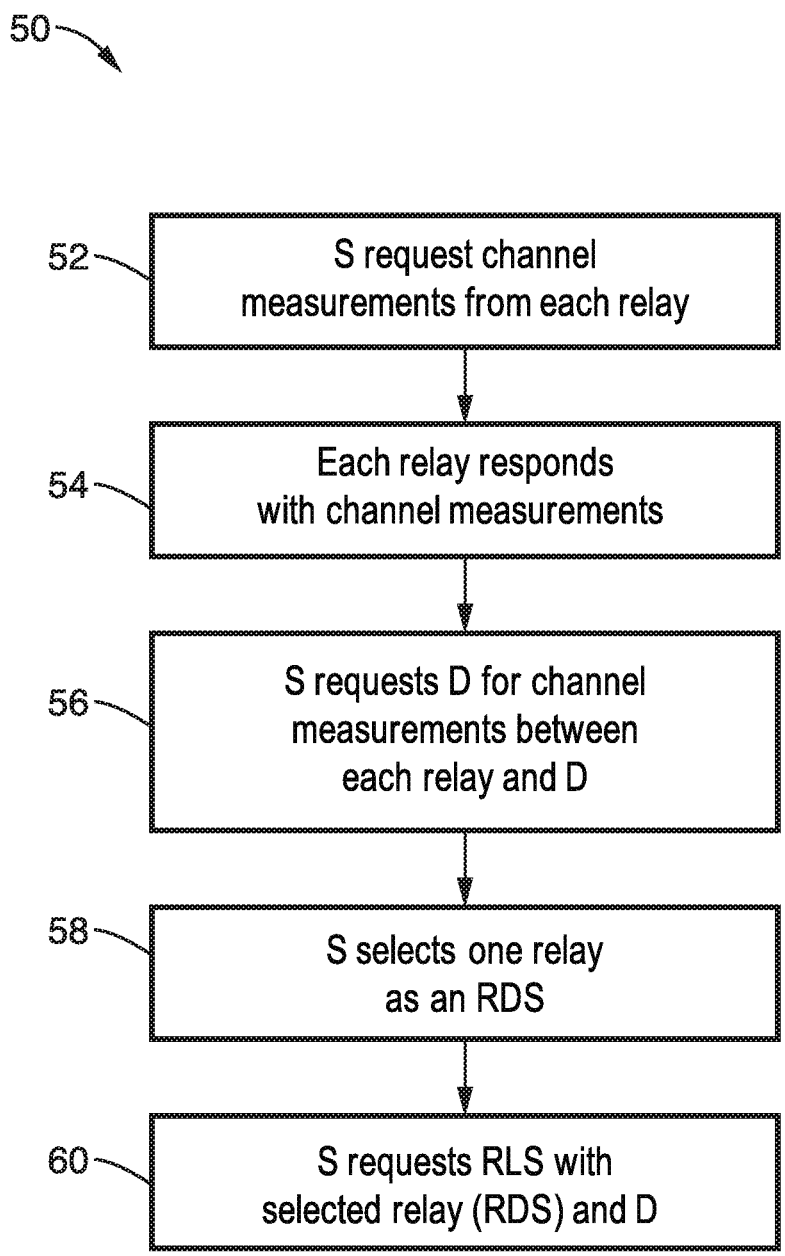
FIG. 11 is a flow diagram of relay selection flow for current 802.11ad mmWave systems.

FIG. 11 illustrates steps 50 involved in relay selection flow at the source for this state of the art mmWave communications. The source REDS (S) requests 52 channel measurements from each relay, to which, in block 54 each relay responds with channel measurements. S then requests 56 destination REDS (D) for channel measurements between each relay and D. S then selects one relay as an RDS in block 58, followed by S requesting RLS with selected relay (RDS) and D in block 60.

FIG. 12 depicts the channel measurement information field format for a state of the art mmWave communications. The Multi-Relay channel response frame provides channel measurement info on the link between either a relay and the source or the destination and all relays. Five fields are shown in the field format. A Peer STA AID subfield (8 bits) contains the Association IDentity (AID) of the STA toward which the reporting STA measures link. The SNR subfield (8 bits) indicates the Signal-to-Noise Ratio (SNR) measured in the link toward the STA corresponding to Peer STA AID. The Internal Angle subfield (7 bits) indicates the angle between directions toward the other STAs involved in the relay operation. The Recommend subfield (1 bit) indicates whether the responding STA recommends the relay operation based on the channel measurement with the Peer STA. This subfield is set to 1 when the relay operation is recommended and otherwise is set to 0. A reserved field (8 bits) is also shown for future use.

With the above background on conventional state of the art 802.11ad mmWave operations, the distinctions of the disclosed apparatus and method should be more readily understood.

2. Using MIMO by the Relay and Central Coordinator.

FIG. 13A illustrates a wireless system using MIMO at the Relay Terminal (RT) and the Access Point (AP) which is acting as a central coordinator. Thus, in using MIMO at the RT and AP, then two device categories arise in regards to their signal processing capability as it relates to communication between the multiple radio nodes. It should be appreciated that MIMO is but one signal processing capability, while the present disclosure is not limited to categorization in relation to MIMO capabilities. Returning to FIG. 13A, the AP in this example is a Cat A device, while the source STA radio nodes are a mixture of Cat A and Cat B device, with relays being more likely selected from the Cat A device. In this example the relay terminal (RT) is a Cat A radio node. Two or more Cat B STAs transmit/receive data simultaneously to/from a Cat A relay terminal (RT) using a Multiple-User (MU)-MIMO technology. The data from/to the STA 1 and STA 2 is multiplexed by the relay terminal and sent/received to/from the AP using MIMO technology. Moreover, the AP drives the relaying procedure and hence can perform an RLS for a group of STAs simultaneously. It should be appreciated that the central coordinator may comprise other MIMO capable devices on the network.

FIG. 13B illustrates system air time for STA 1 and STA 2 for the above scenario, wherein it is seen that only two slots, plus the RLS messaging time are required, which is in the order of half of that required by the current state of the art, such as was depicted in FIG. 7B.

The capability of multiplexing data streams for wireless communications can be performed in the spatial domain utilizing Line-of-Sight (LOS) MIMO, polarization MIMO, and other MIMO techniques as will be appreciated by one of ordinary skill in the art. In this method, the AP determines: (a) when relaying is needed, (b) which Cat A STA will act as a Relay, (c) which Cat B STAs will be grouped together to have its data multiplexed. The AP makes these determinations based on one or more of the following characteristics/measurements: (a) RSSI, (b) SNR, (c) Cat A/B capability, (d) Relaying Capability, (e) Angle of Arrival/Departure (AoA/AoD), and (f) power connection (e.g., presence of AC/DC power).

One cannot simply elect to use MIMO at the relay and AP to implement such a system. To make this approach realizable there are significant interoperable changes necessary as described below.

The disclosed system requires modifications to the superframe of mmWave WLAN systems, such as the superframe in the 802.11ad standard.

Figure 14A:
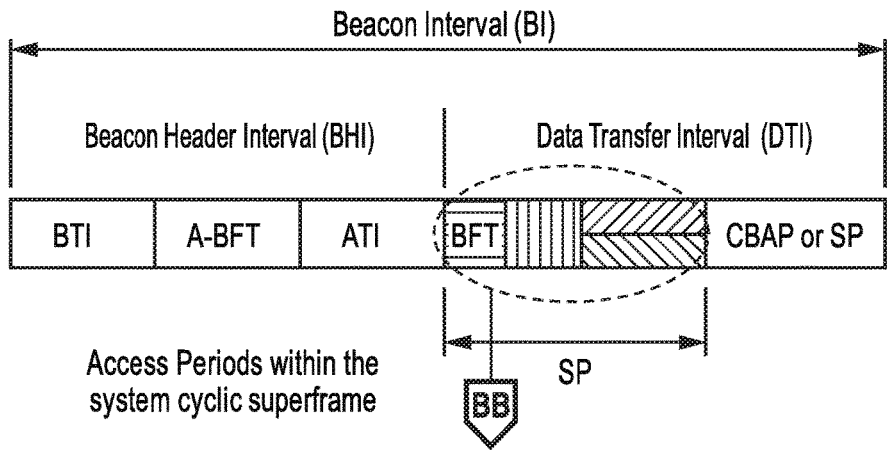
FIG. 14A and FIG. 14B are data field formats depicting a beacon interval (BI) (FIG. 14A) and relaying service period (SP) (FIG. 14B) within the BI according to an embodiment of the present disclosure.

FIG. 14A illustrates a modified beacon interval (BI) for use in the present disclosure. The differences in this new BI are readily when compared with FIG. 8 for a state of the art 802.11ad system. In FIG. 14A the relaying service period (SP), which is circled in the figure, is modified to contain multiple training and data transmission frames.

Figure 14B:
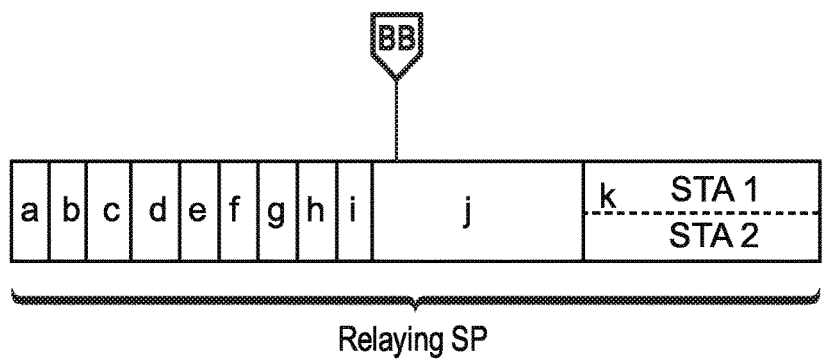

FIG. 14B depicts in greater detail fields within the Relaying SP, showing fields a through j, and a k field split for STA 1 and STA 2.

The use of the SP in this manner may be better understood by considering the following communications scenario. Consider performing a downlink transmission, from the AP to the relay STA, and then to destination STAs. Assume multiplexing the data of only two STAs by the relay STA.

The following contents in the relaying SP may be present, as seen in fields a-k in the relaying SP: (a) beamforming (BF) refinement between AP and Relay; (b) a channel state information metric feedback by Relay (for MIMO operation); (c) BF training between Relay and STA 1 (including Tx and Rx sectors training); (d) BF training between Relay and STA 2 (including Tx and Rx sectors training); (e) probing sequence from Relay to STA 1 (needed for digital pre-coding of MU-MIMO streams); (f) channel state information metric feedback by STA 1; (g) probing sequence from Relay to STA 2 (needed for digital pre-coding of MU-MIMO streams); (h) channel state information metric feedback by STA 2; (i) simultaneous pilot transmission by STA 1 and STA 2 for inter-user interference estimation by Relay; (j) AP to Relay data transmission using MIMO; and (k) relay to STA 1 and STA 2 data transmission using MU-MIMO.

In addition, it must be appreciated that management frames transmitted during the beacon header interval (BHI) period require modification to account for MIMO capabilities in wireless systems.

Figure 15:
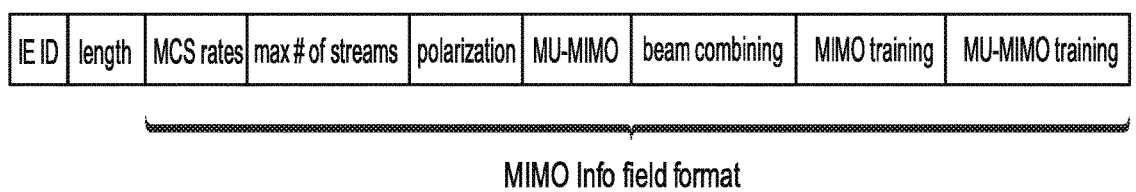
FIG. 15 is a data field format for MIMO communications utilized according to an embodiment of the present disclosure.

FIG. 15 illustrates a modified MIMO information field format which conveys MIMO device capabilities in an information element (IE) format that shall be transmitted with management frames. In at least one embodiment, the management fields can include the following contents: an (IE ID) IE identification number; (length) length of the following capabilities field; along with a MIMO capabilities Info field. This MIMO info field may include: (MCS rates) MCS data rates supported; (max # of streams) maximum number of data streams supported by the device; (polarization) whether dual-polarization MIMO is supported or not; (MU-MIMO) whether multiple-user (MU) MIMO is supported or not; (beam combining) whether beam combining capability is supported or not, and if supported, how many beams can be combined; (MIMO training) MIMO training sequence support; (MU-MIMO) whether multiple-user (MU)-MIMO exclusive training fields are supported or not, such as including sequences used for inter-user interference estimation. It will be appreciated that the above may be modified by one of ordinary skill in the art to add or delete field without departing from the teachings of the present disclosure.

The detailed communications sequence during a BI is as follows: (a) AP send beacons at the lowest data rate of the system (MCS 0) during the beacon transmission interval (BTI) period. (b) The beacons are heard by STAs covered by the transmission range of MCSO. (c) At the start of the Association-BF Training (A-BFT) period, the STAs contend for association. (d) Once associated, the STAs and the AP perform a simplified beamforming (BF) training. (e) During the A-BFT period, the AP can determine the RSSI or received SNR, Cat A or Cat B device capability, and an estimate of AoA/AoD of each station. (f) During the following Announcement transmission interval (ATI), the AP can exchange limited management frames with associated stations. These frames allow AP to know relaying capabilities of stations and AC/DC power supply flag which gives indication on mobility. It can also be used for further refinement of AoA/AoD estimation. (g) The AP takes the aforementioned decisions regarding relaying of data based on the metrics estimated during the A-BFT and ATI periods. (h) AP schedules a service period (SP) in which data communications with the aid of a relay shall be accomplished. (i) During the start of the relaying SP, refinement of BF training (BRP) is needed to confirm validity of relaying decision, to perform further training for MIMO communication between relay and AP, and to perform UL/DL MU-MIMO communication training between the relay and the STAs. (j) Finally, data communications take place with the aid of the relay and acknowledgment of success/failure of communications is received at the AP and STAs.

Figure 16:
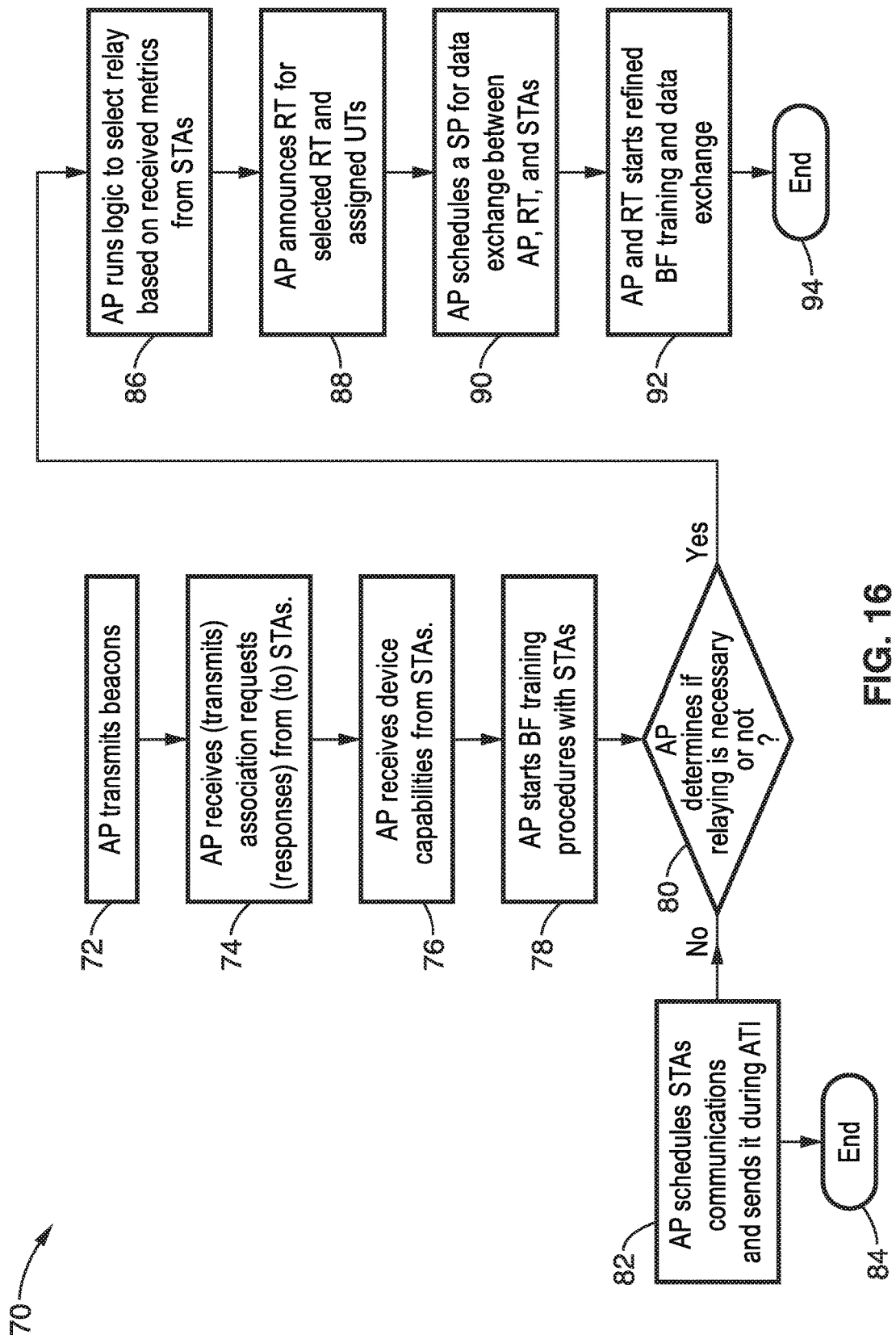
FIG. 16 is a flow diagram for controlling relaying from the access point (AP) according to an embodiment of the present disclosure.
Figure 17:
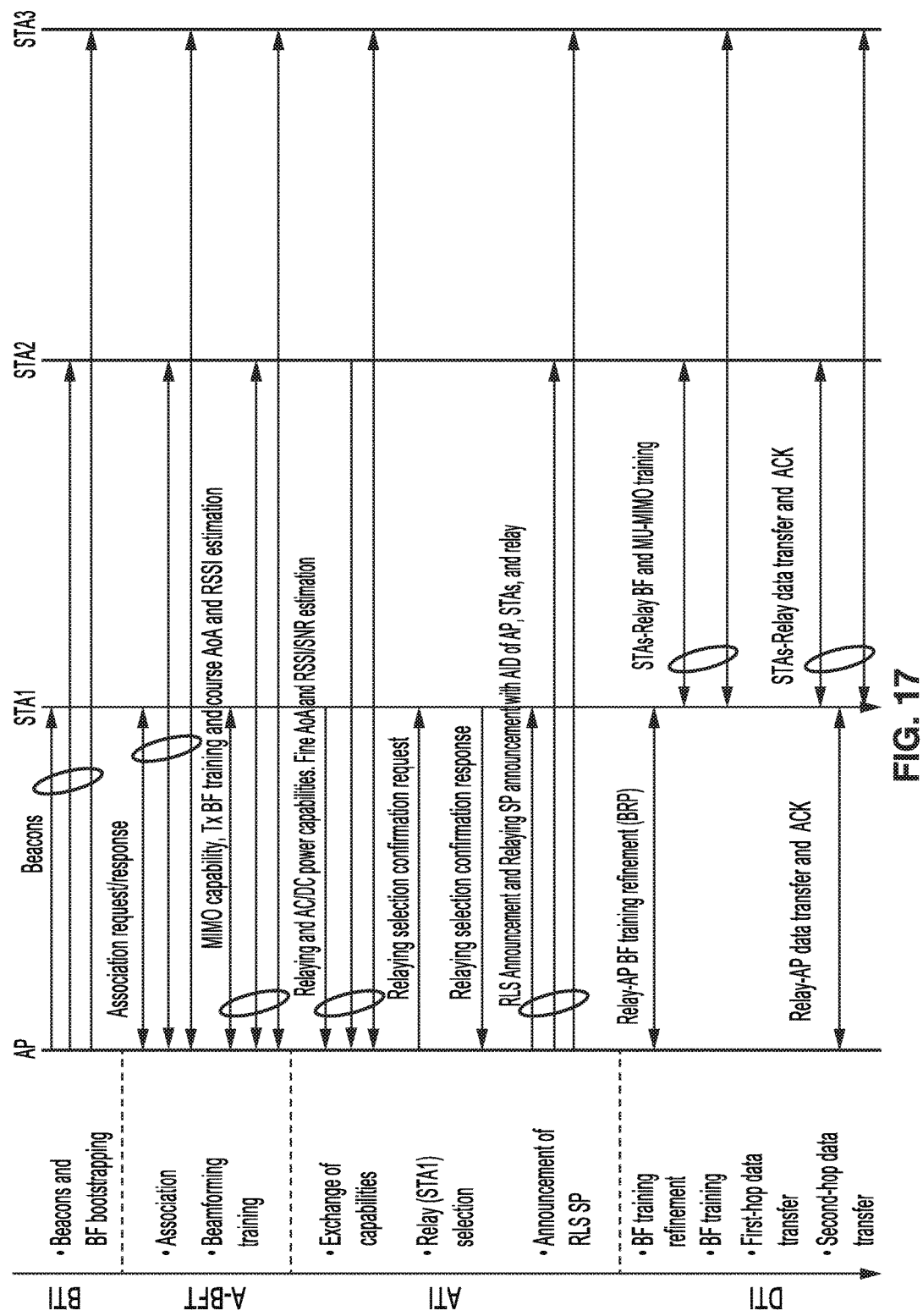
FIG. 17 is a message sequence for mixed Cat A, Cat B relaying for mmWave WLAN according to an embodiment of the present disclosure.

FIG. 16 and FIG. 17 summarize the above relaying procedure by AP decisions flow logic (FIG. 16) and a detailed messaging sequence (FIG. 17) for that logic.

In a flow logic embodiment 70 of FIG. 16 the AP transmits beacons 72, and then receives/transmits 74 association requests/responses from/to the STAs. Device capabilities are received 76 by the AP from the STAs, upon which the AP starts 78 beamforming (BF) training with the STAs. The AP then determines 80 if relaying is necessary or not. If it is determined that relaying is not needed (e.g., destination STA in well within range) then AP schedules 82 STAs communications and sends it during ATI, and this sequence ends 84.

If on the other hand it is determined that relaying is needed (e.g., destination is near edge of range), then AP runs logic 86 for selecting a relay based on receiving metrics from the STAs. AP then announces 88 the node that is to be the selected RT (relay terminal) and the assigned STAs. The AP schedules 90 an SP for data exchange between AP, RT and STAs, with the AP and RT starting 92 a refined BF training and data exchange, after which this sequence ends 94.

In FIG. 17 is seen the messaging sequence for the above. In the far left columns are seen the high level description of the steps, including (BTI) "Beacons and BF bootstrapping" at the top, followed by (A-BFT) "Association", "Beamforming Training". In the third section down on the left one sees the general ATI steps of "Exchange of Capabilities", "Relay (STA1) Selection", and "Announcement of RLS SP". The bottom left column contains the general DTI steps of "BF Training Refinement", "BF Training", followed by "First hop data transfer", "Second hop data transfer" and so forth.

It will be noted that the right portion of the message sequence diagram depicts messages between the access point (AP), STA1, STA2, and STA3. The ovals surrounding groups of messages depict related operations, such as at the top beacons are sent to each of the STAs, shown as STA 1, STA 2, and STA 3. The AP first exchanges Beacons, Association requests and responses with the STAs in the network. After successful association, messaging needed for MIMO capability information and BF training takes place. AP can request from the STAs further information to aid in the relay selection decision. The STAs reply with some metrics including relaying capability flag state and AC/DC power capabilities. The AP notifies the STA selected as the Relay STA (this is STA1 in FIG. 17), and receives confirmation from the selected Relay STA. Announcement of relay link setup (RLS) and the timing of the relaying SP is then transmitted to each STA participating in the relaying phase including the Relay STA (STA1 as an example) and STA2 and STA3. Furthermore, messaging could be needed to refine the BF training between the AP and the selected Relay STA. Another BF training messaging is carried over between the Relay STA and the destination STA including training messages needed for MU-MIMO operation. Finally, data is exchanged in one hop between the AP and the Relay STA and in another hop between the Relay STA and simultaneously STA2 and STA3. It is readily seen that the messaging sequence of FIG. 17 is quite distinct from that previously described for FIG. 10 for a state of the art mmWave 802.11ad.

Figure 18:
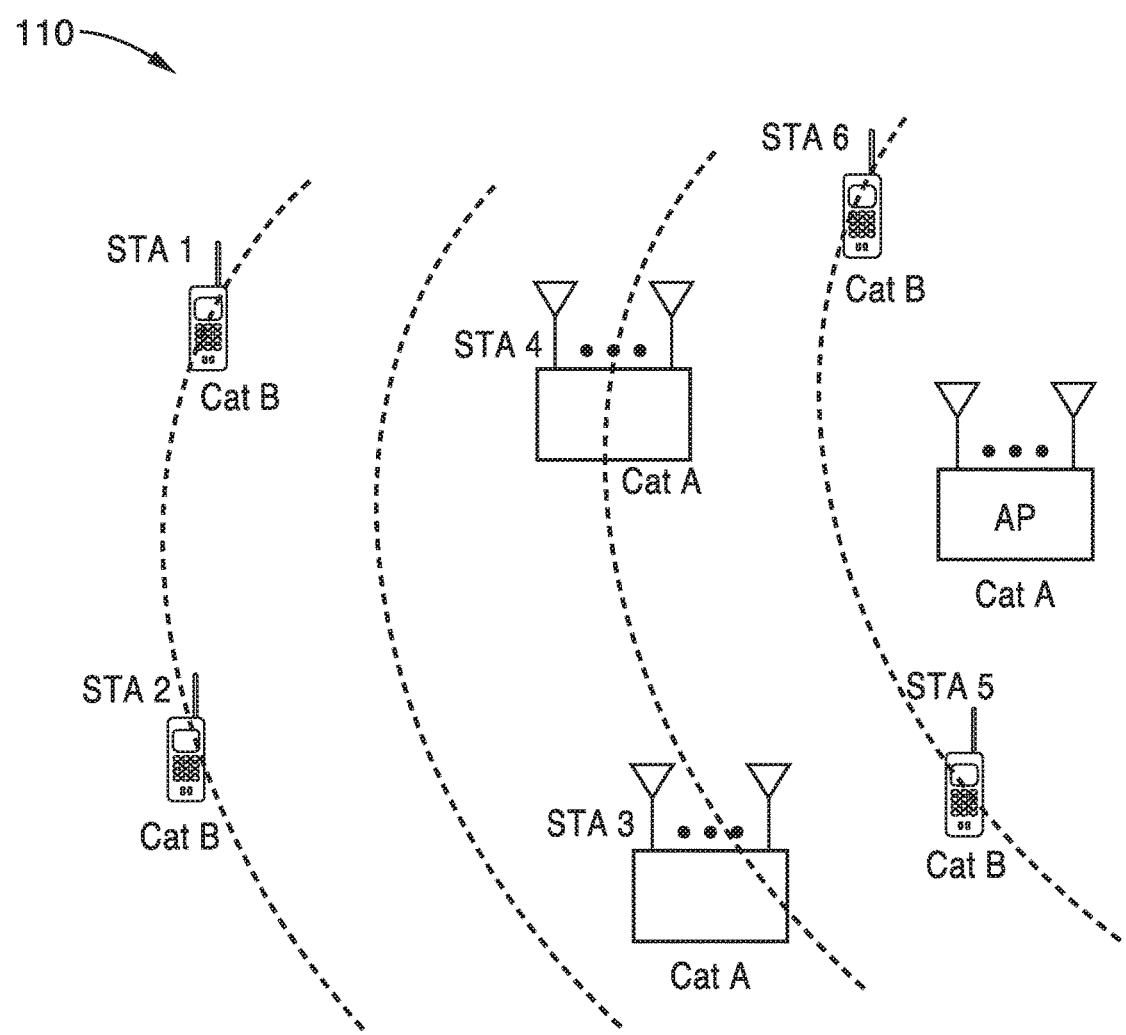
FIG. 18 is a radio node diagram for exemplifying the decision making process within the AP according to an embodiment of the present disclosure.

FIG. 18 illustrates an example embodiment scenario 110 and the decision making logic at the AP. In this scenario: (a) six stations associate with the AP in one basic service set (BSS), (b) four stations in this example are Cat B STAs, while two of these STAs are close to the AP while the other two are at the far extent of the AP communication range (after which communications with the AP is not possible even at MCSO which is not used for data communications). Two of the stations (STA 3 and STA 4) are Cat A STAs. The relaying capability flag is ON for both of these stations as well as the AC power flag. It will be noted that the AC power flag in this embodiment is configured for: (1) indicating low mobility or no mobility and hence it is less likely that variations will arise with the quality of the links involving the relay STA; (2) indicating that relaying will not affect the relay STA energy consumption, for example there are no battery life issues for the system to take into account.

Figure 19:
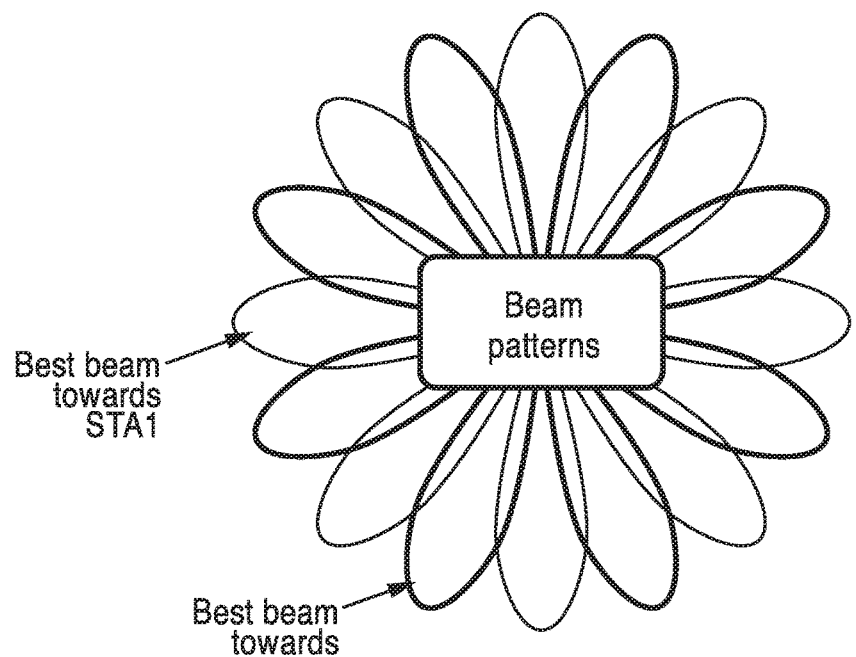
FIG. 19 is a beam pattern diagram shown for use according to an embodiment of the present disclosure.

FIG. 19 illustrates a beam pattern from the AP, with radiating lobes that can be controlled by beamforming, as depicted by way of example and not limitation. In the figure, the best beams (optimized direction for the given scenario) are marked as directed towards both STA 1 and STA 2. Using a relay to communication data with STA 1 and STA 2 is preferred, since both STAs are far from the AP.

Figure 20:
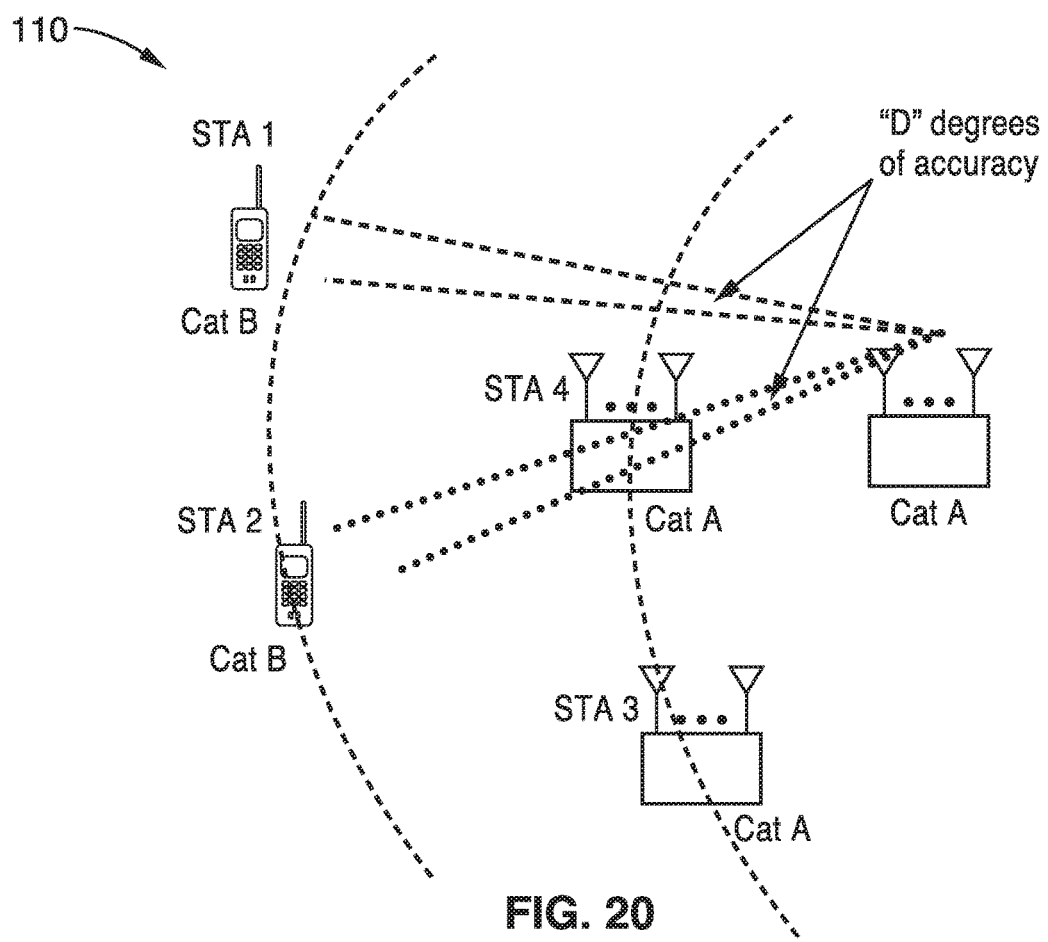
FIG. 20 is a radio node diagram showing beam patterns in the decision-making process within the AP according to an embodiment of the present disclosure.

FIG. 20 illustrates the scenario 110 of FIG. 18, showing beam path ranges and directions from the AP to STA 1 and STA 2 with dashed lines. Both coarse AoA/AoD and RSSI estimation can be performed during the BF training between the AP and the network stations. Each STA feeds back the best transmit beam of the AP to that STA (and vice versa) which provides a coarse AoD (AoA) indication. During the ATI, using management frames both the exchange and refinement of RSSI is performed. In addition, further refinement of AoA is possible by running array signal processing algorithms (e.g., MUSIC) at the AP.

AoA estimation is performed together with RSSI aids in selecting the candidate relay and the grouping of Cat B STAs as follows. RSSI values of STA 3 and STA 4 lie almost in mid range of STA 1 and STA 2 RSSI values. Furthermore the AoA/AoD estimation from both STA 3 and 4 show their location with respect to the AP in the same side as STA 1 and STA 2. In addition STA 3 and STA 4 are Cat A devices, which makes any of them a viable candidate to be a relay for STA 1 and STA 2. Fine AoA/AoD estimation resolves the doubt about relay selection.

Assume X degrees of AoA/AoD estimation accuracy as seen in the figure. STA 4 AoA/AoD is at (180+/−D degrees while STA1 is at (160+/−D degrees). STA2 is at (210+/−D) degrees, all with respect to the AP. STA 3 AoA/AoD on the other hand is at (260+/−D) degrees with respect to the AP.

The logic at the AP would then decide to select STA 4 as it lies in a central location to both STA 1 and STA 2 compared to the location of STA 3, which is on a different angular path than STA 1 and STA 2. The AP thus selects STA 4 as a relay terminal for STA 1 and STA 2 and announces this decision during the ATI.

Figure 21:
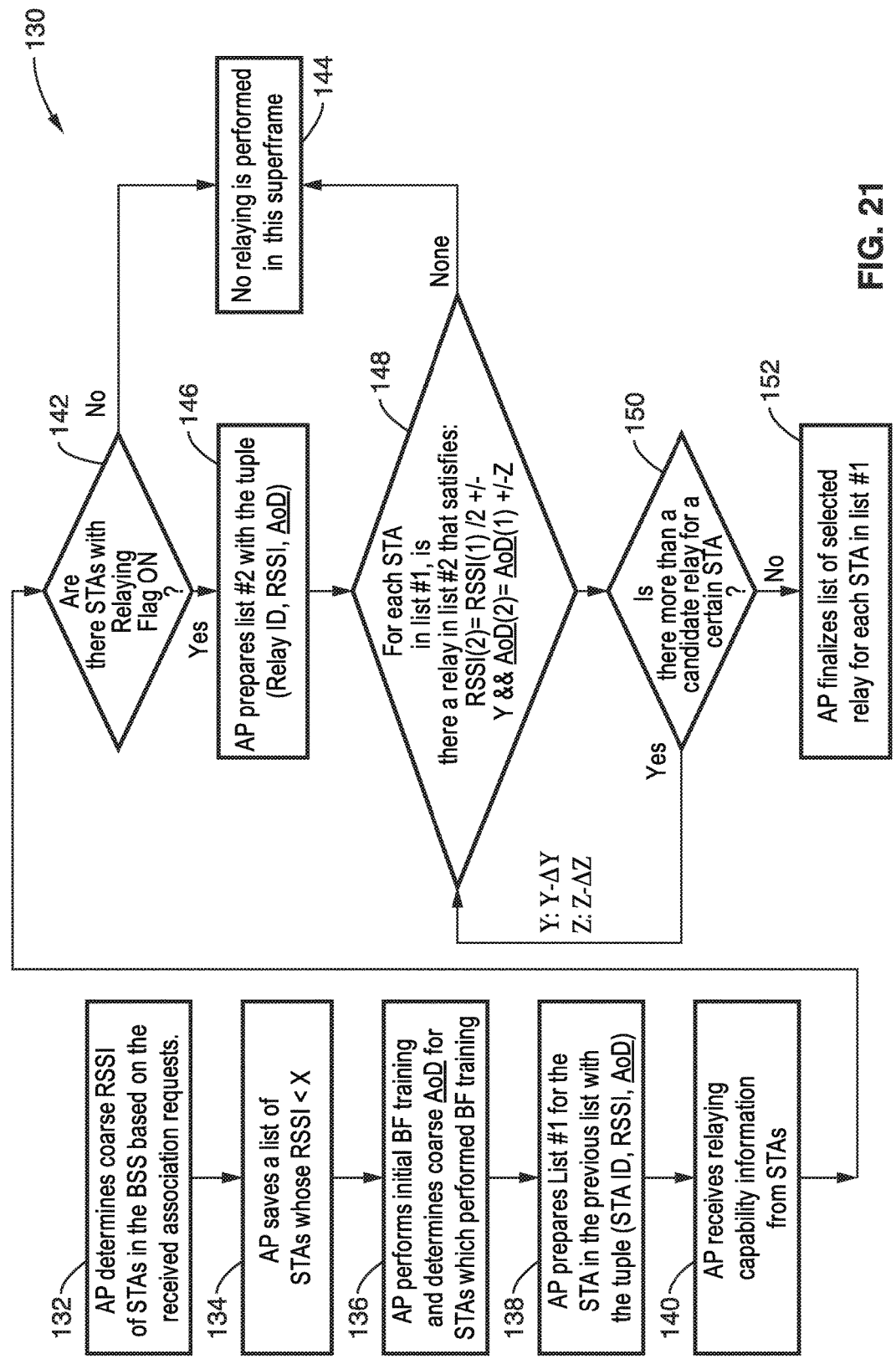
FIG. 21 is a flow diagram depicting the use of AoA/AoD and RSSI (signal strength) metrics in the selection of a relay according to an embodiment of the present disclosure.

FIG. 21 illustrates an embodiment 130 for using AoA/AoD and RSSI metrics for relay selection. In this flow diagram AP determines coarse RSSI of STAs in the BSS as shown in block 132, based on the received associated requests. The AP saves 134 a list of STAs whose RSSI is less than X. It should be noted that the values of X, Y, and Z are threshold values determined according to specific implementation details. Table 1 presents one example of selecting the values for X, Y, and Z.

In block 136 the AP performs initial BF training and determines coarse AoD for STAs which performed BF training, then the AP prepares 138 a first list (List #1) for the STA in the previous list with the tuple (STA ID, RSSI, and AoD), after which the AP receives 140 relaying capability information from the STAs.

A determination 142 is made if there are STAs having their relaying flags on. If not, then block 144 is executed, in which no relaying is performed during this superframe. In the case where at least one STA has its relay flag on, then in block 146 the AP prepares a second list (List #2) with the tuple (Relay ID, RSSI, AoD). A determination is made in block 148 for each STA in the first list (List #1), that there is a relay in the second list (List #2) that satisfies the condition: RSSI(2)=RSSI(1)/2+/−Y && AoD(2)=AoD(1)+/−Z, where RSSI(1) is the RSSI of a STA in List#1 and RSSI(2) is the RSSI of a candidate relay in List#2 and similarly for AoD. If no relay satisfies this condition, then execution moves to block 144 and no relaying is performed in this superframe. Otherwise execution continues to decision 150 to determine if there is more than one candidate relay for a certain STA. If there is more than one candidate, then an incremental adjustment is made to values Y and Z, such as Y=Y−ΔY, and Z=Z−ΔZ, and a return to block 148 in search of a relay to satisfy the condition. If there is only one candidate relay, then execution is directed to block 152 in which the AP finalizes the list of selected relays for each STA in the first list (List #1).

Figure 22:
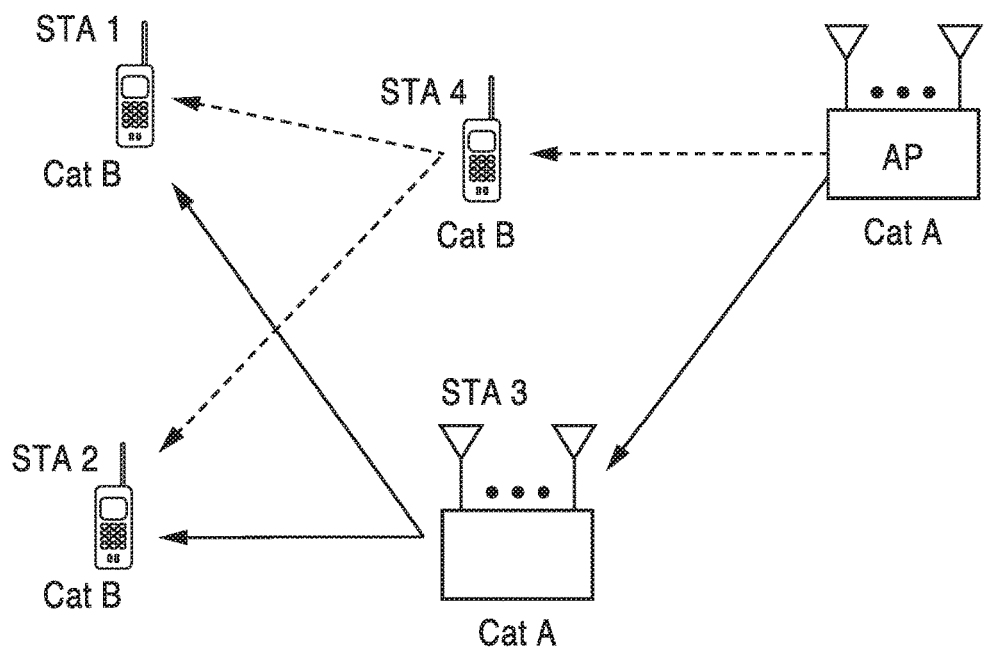
FIG. 22 is a radio node diagram exemplifying the relay node selection decision within the AP according to an embodiment of the present disclosure.

FIG. 22 provides another example of using combinations in the aforementioned metrics. In FIG. 22 a scenario is shown with an AP and STA 1, STA 2, STA 3 and STA 4. The AP and STA 3 are Cat A, with the STA 1, STA 2, STA 4 as Cat B. One communication path is shown as a solid line with an alternative communication path shown in a dashed line.

In this example scenario, the AoA/AoD and RSSI metrics suggest that STA 4 is more suited to be selected as the relay terminal. However, STA 4 is a Cat B device, and the air time needed to finish the data communication transaction from STA1 and STA 2 to the AP with Cat B relay is about twice that with the Cat A relay. The AP logic will check if the data rate supported on the individual links from AP to Cat A STA 3 are only slightly lower than those of Cat B STA 4. If so, the AP will still select STA 3 (Cat A devices) as a relay terminal to provide improved network-wide spectral efficiency.

Figure 23:
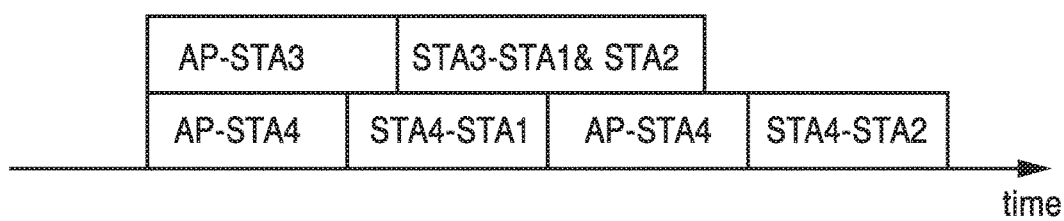
FIG. 23 is an air time diagram comparing the air time utilized in response to selecting the Cat B STA 4 node, or Cat A STA 3 node, as shown in FIG. 22.

FIG. 23 shows an air time comparison for the above scenarios between using STA 3 (Cat A) as the relay from the AP in the upper air time block, compared with using STA 4 (Cat B) as the relay from the AP, shown in the lower row of air time blocks. It can be seen that air time is reduced in using STA 3 for the relay even if in some cases CAT A relay links are worse, for example having lower SNR, than CAT B relay links.

Figure 24:
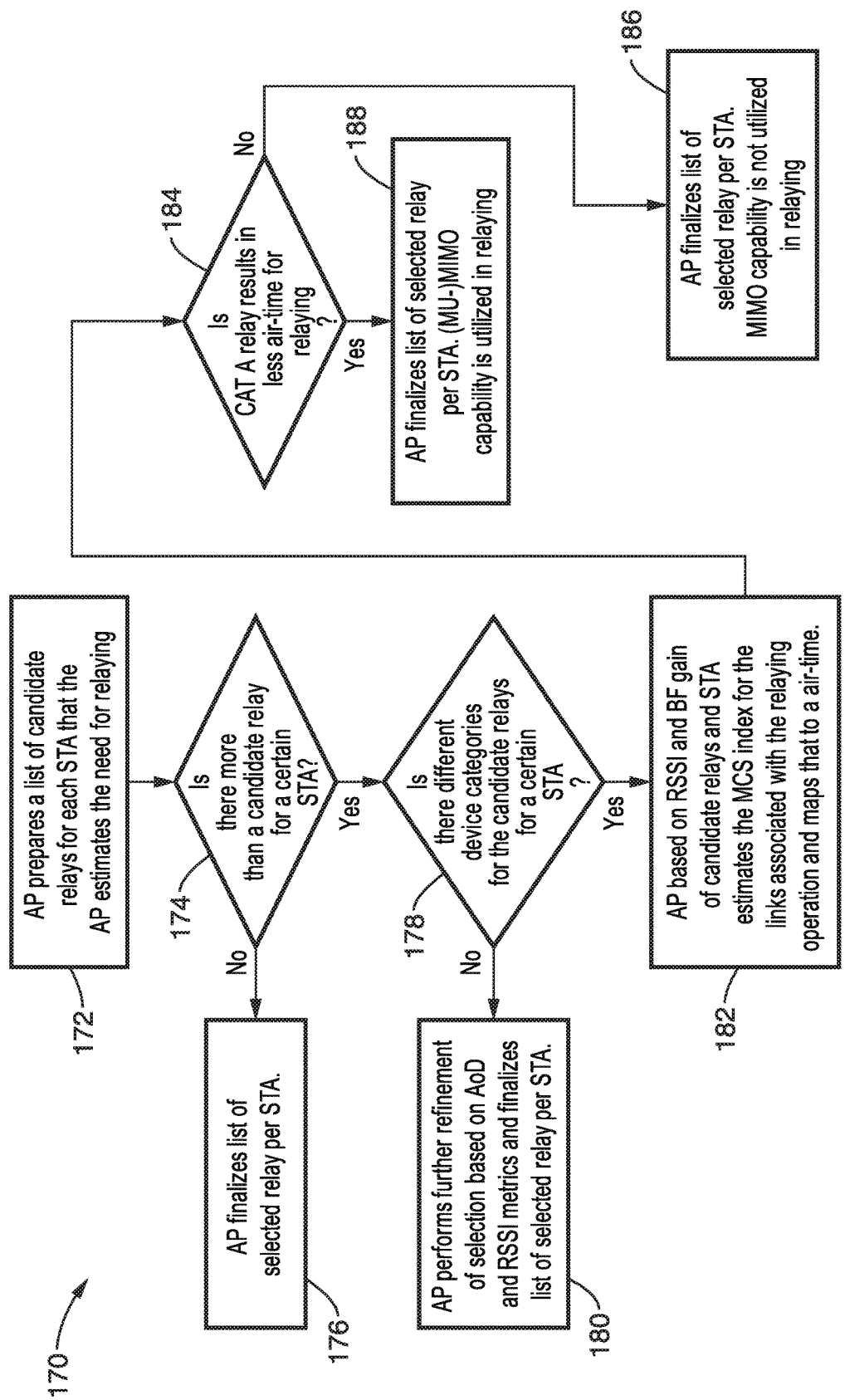
FIG. 24 is a flow diagram of utilizing device category metric in the relay selection process according to an embodiment of the present disclosure.

FIG. 24 illustrates an embodiment 170 of utilizing a device category metric for determining relay selection. The AP prepares a list 172 of candidate relays for each STA that the AP estimates the need for relaying. A determination is made 174 if there is more than one candidate relay for a certain STA. If not, then in block 176 the AP finalizes a list of selected relays per STA. Otherwise, if not more than one candidate is found, then a decision is made in block 178 if there are different device categories for the candidate relays for a certain STA. If not, then block 180 is executed with the AP performing further refinement of the selection based on AoD and RSSI metrics and it finalizes the list of selected relays per STA. Otherwise, if there are different device categories, then block 182 is reached with AP decision being based on RSSI and BF gain of the candidate relays and STA estimates of the MCS index for the links associated with the relaying operation and it maps that to an air time.

A decision is then made in block 184 to determine if using a Cat A relay results in less air time for relaying. If less air time is required using Cat A, then execution reaches block 188 where the AP finalizes the list of selected relays per STA, and MU-MIMO capability is utilized in the relaying. If it is estimated that using the Cat A relay will not decrease air time, then execution reaches block 186 where the AP finalizes the list of selected relays per STA, with MIMO capability not being used in the relaying. If it is estimated in block 184 that Cat A should reduce air time then execution branches to block 188 in which the AP finalizes list of selected relay per STA, with MU-MIMO capability being utilized in the relaying.

Figure 25:
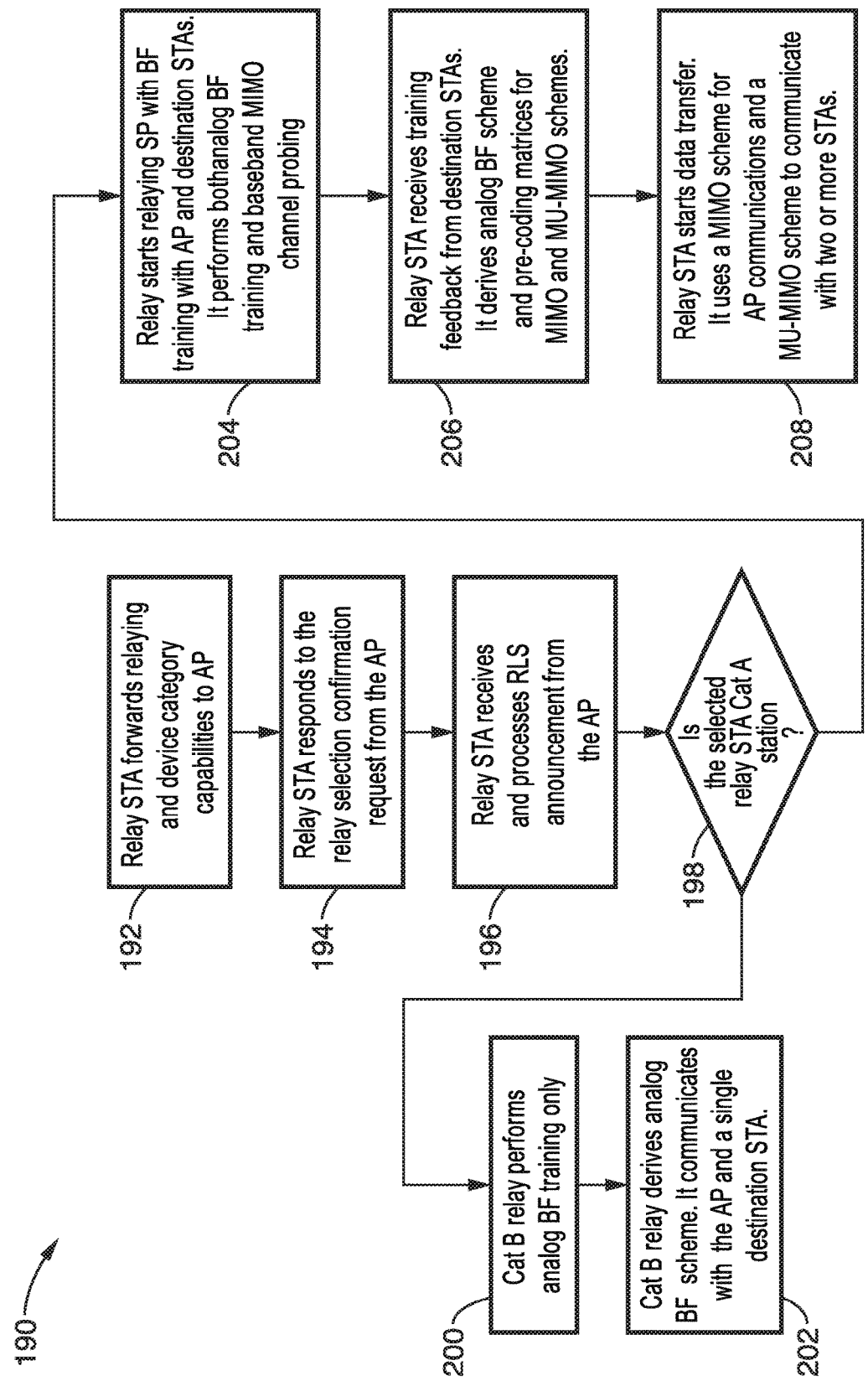
FIG. 25 is a flow diagram of relay link setup (RLS) based on node category according to an embodiment of the present disclosure.

FIG. 25 illustrates an embodiment 190 of relay STA flow logic. In block 192 the relay STA forwards relaying and device category capabilities to the AP. Then the relay STA responds 194 to the relay selection confirmation request from the AP, with the relay STA receiving and processing 196 RLS announcements from the AP. In block 198 a determination is made if the selected relay STA is a Cat A station. If it is not Cat A, then in block 200 analog BF training is performed on the Cat B relay, followed by the Cat B relay deriving 202 the analog BF scheme. One way of implementing the analog BF scheme is to apply appropriate weights to the analog phase shifters to steer the transmit beams to the sectors reported by the AP and the STA during BF training as the best BF sectors. If it is determined in block 198 that the selected relay is Cat A, then execution branches to block 204 and the relay starts relaying SP with BF training with AP and destination STAs. Both analog BF training and baseband MIMO channel probing are performed on this Cat A relay. After which the relay STA receives training feedback 206 from destination STAs. The relay derives analog an analog BF scheme and pre-coding matrices for MIMO and MU-MIMO schemes. The Cat A relay STA then commences data transfer 208, using a MIMO scheme for AP communications, and a MU-MIMO scheme to communicate with two or more STAs.

Figure 26:
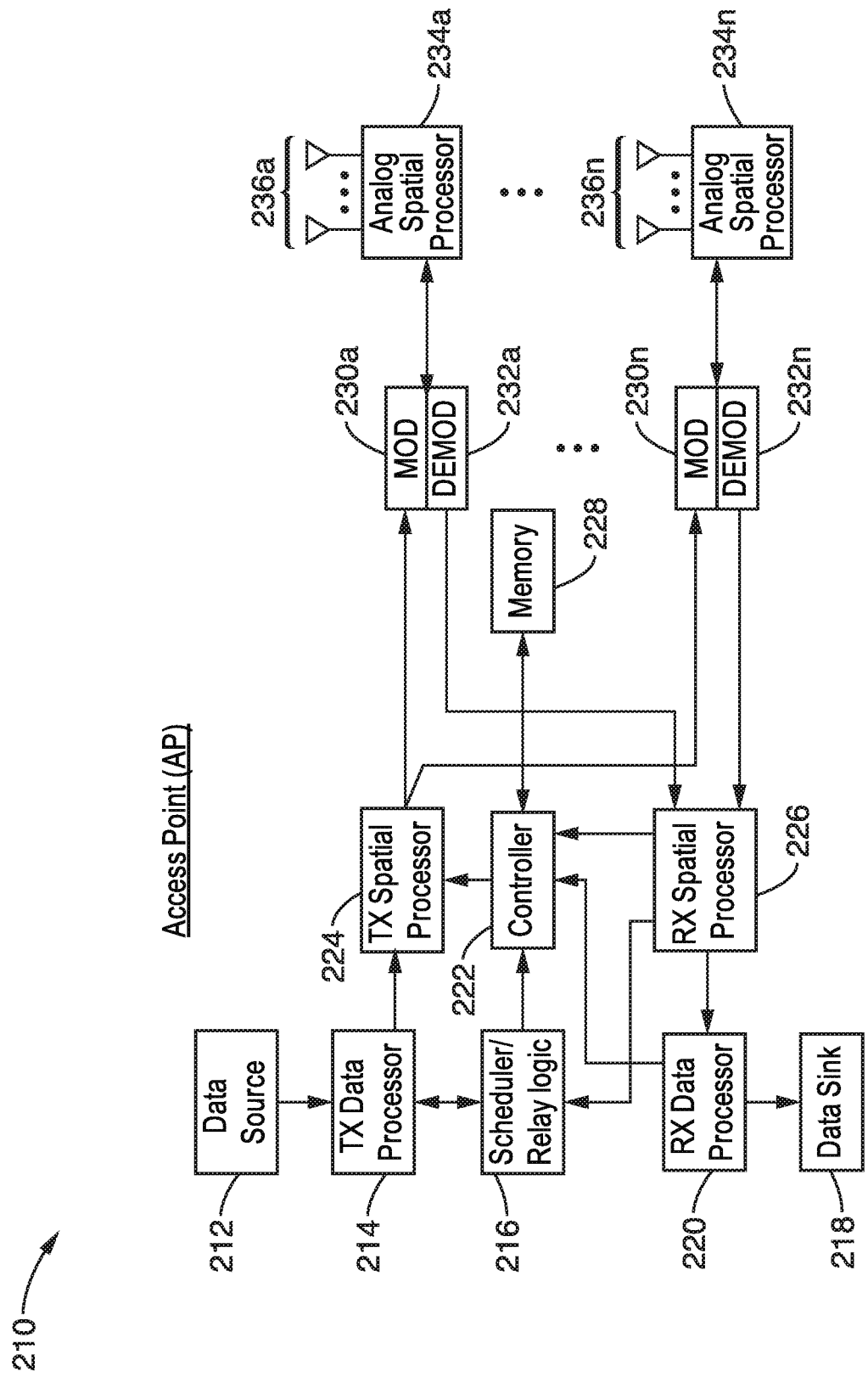
FIG. 26 is a block diagram of a Cat A hardware embodiment according to an embodiment of the present disclosure.

FIG. 26 illustrates an example embodiment 210 of Cat A hardware functionality for an access point, relay terminal and client terminal. A data source 212 is coupled to a transmitter (TX) data processor 214, which is coupled to a combination scheduler and relay logic 216, as well as to a TX spatial processor 224. On the receiver side, signals are received from a demodulator 232n to a receiver (RX) spatial processor 226, which is coupled to a receiver (RX) data processor 220, coupled to a data sink 218. RX data processor 220 and RX spatial processor 226 source data to a controller 222, which has outputs to TX data processor 214 and TX spatial processor 224. Controller 222 is also coupled to scheduler/relay logic 216, as well as to a memory 228. Pairs of modulators/demodulators are coupled to the analog spatial processor inputs/outputs, shown with a first modulator 230a, first demodulator 232a, coupled to a first analog spatial processor 234a, with antennas 236a; with these elements being duplicated for any desired number of input/outputs down to modulator 230n, demodulator 232n, analog spatial processor 234n and antenna array 236n.

Figure 27:
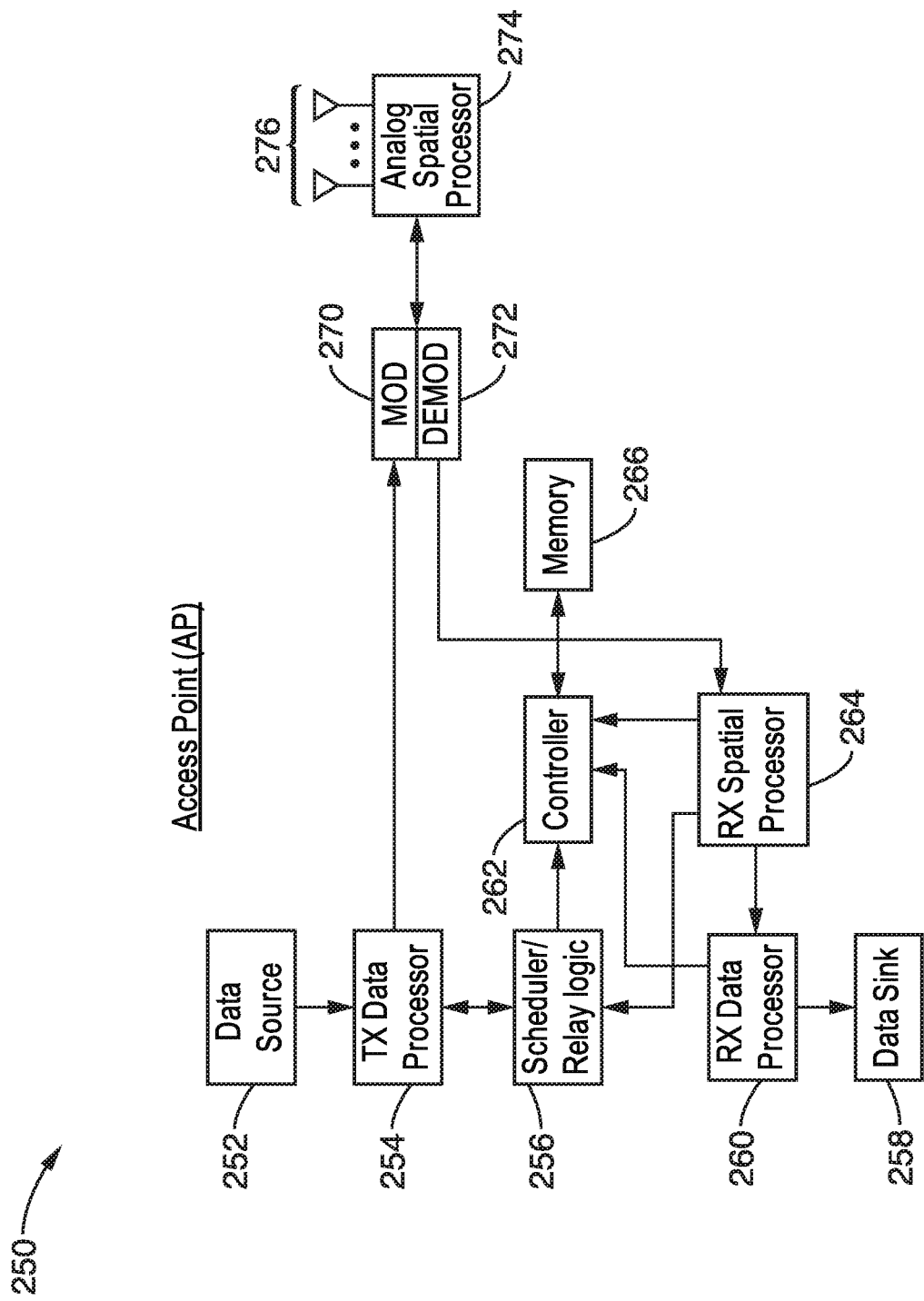
FIG. 27 is a block diagram of a Cat B hardware embodiment according to an embodiment of the present disclosure.

FIG. 27 illustrates an example embodiment 250 of Cat B hardware functionality for an access point, relay terminal and client terminal. It will be appreciated that this is a subset of the hardware found in the Cat A hardware, so the following may seem repetitive. A data source 252 is coupled to a transmitter (TX) data processor 254, which is coupled to a combination scheduler and relay logic 256. There is no TX spatial processor. On the receiver side, signals are received from antennas 276 on an analog spatial processor 274 to a demodulator 272 to a receiver (RX) spatial processor 264, which is coupled to a receiver (RX) data processor 260, coupled to a data sink 258. RX data processor 260 and RX spatial processor 264 source data to a controller 262, which has outputs to TX data processor 254. Controller 262 is also coupled to scheduler/relay logic 256, as well as to a memory 266. One pair of modulators/demodulators utilized with a modulator 270 and demodulator 272 is coupled to the analog spatial processor 274 with antennas 276 in the array for this single-input, single-output Cat B device.

The above embodiments in FIG. 26 and FIG. 27 both describe hardware for an access point (AP), yet hardware for a client terminal or relay terminal, can be implemented using the same basic hardware, but leaving out the scheduler/relay logic (element 216 in FIG. 26, and element 256 in FIG. 27). Thus, a Cat A client terminal or relay terminal can be implemented according to the present disclosure using the hardware of FIG. 26 without inclusion of the scheduler/relay logic 216. Similarly, a Cat B client terminal or relay terminal can be implemented according to the present disclosure using the hardware of FIG. 27 without inclusion of the scheduler/relay logic 256.

Figure 28:
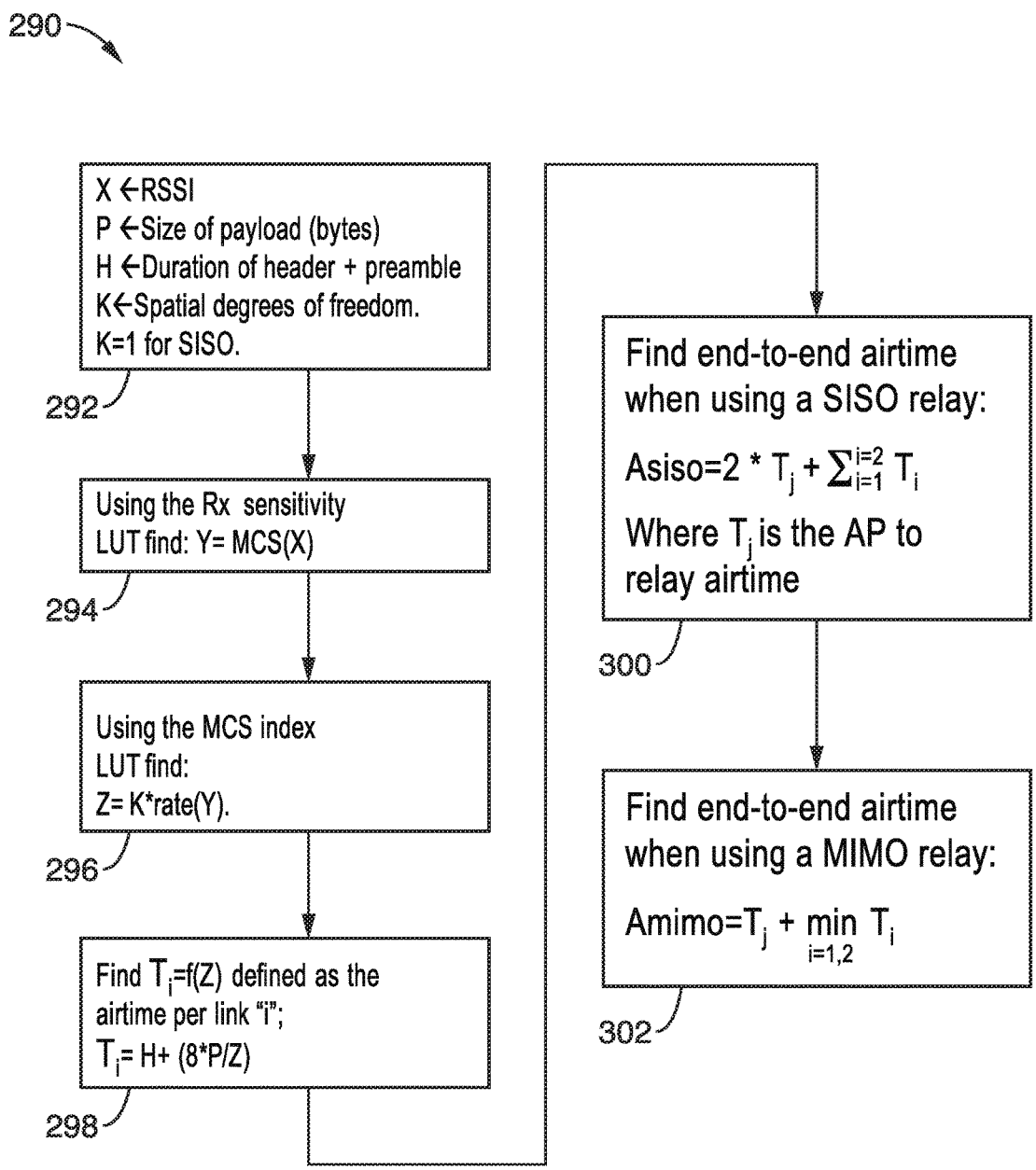
FIG. 28 is a flow diagram of mapping RSSI (signal strength) to air time according to an embodiment of the present disclosure.

FIG. 28 illustrates an example embodiment 290 of mapping of RSSI to air time. The following expands the description of mapping of RSSI to air-time as seen in block 182 of FIG. 24. It is assumed that H=fixed duration for preamble and header, it will be noted that they are independent of the data rate. An assumption can be made for single-carrier (SC) PHY transmission, with the same logic applicable to OFDM PHY. In this case, the difference between the airtime of MIMO versus SISO STAs is in the data packet time. It is assumed to let X=RSSI received at a STA or relay, but this can be modified as desired to the needs and application. MCS(X) was defined to be the modulation index assumed for a signal received at RSSI of X, and this again could be modified as desired. A fixed payload size of P (bytes) was assumed, and can be modified as desired.

Determining this air time needed to transmit a data packet from AP to STAs under the above conditions is mapped from RSSI as follows: (a) Find MCS(X) from the sensitivity table in the 802.11ad standard. Table 2 is a table of receiver sensitivity, with Table 3 listing modulation and coding scheme for the SC. MCS(X) is the MCS corresponding to the largest sensitivity required as determined from Table 2. Table 3 is used in mapping MCS(x) to data rate Z (Mbps). The airtime of one link is calculated as: H+P*8/Z. End-to-end airtime is determined for a SISO (in general Cat B) relay and a Cat A relay as the sum of the airtime of individual links.

Referring now to the specific steps in FIG. 28, in block 292 variables are initialized with variable X set to RSSI as received at an STA or relay, P set to size of the payload, H set as duration of header plus preamble, K set to represent the spatial degrees of freedom, with K=1 being for single-input single-output SISO. In block 294 the receive (Rx) sensitivity is utilized (e.g., as an index) to find Y=MCS(X), such as utilizing a look-up table (LUT), calculation, or other determination. Using this MCS index the value Z=K*rate (Y) is determined 296, such as through another LUT, or other mechanism. Then in block 298 the value $T_i$=f (Z) is defined as the air-time per link "i"; $T_i=H+(8*P/Z)$. Then end-to-end air time is estimated 300 when using a SISO relay (Cat B) as $Asiso=2*T_j+\Sigma_{i=1}^{i=2}T_i$, wherein $T_j$ is the AP to relay air time. Then end to end air time is estimated 302 when using a MIMO relay (e.g., Cat A)

$$Amimo = T_j + \min_{i=1,2} T_i.$$

An example is described below with respect to the topology described for FIG. 22. The preceding equation and the MCS sensitivity and rate tables can be utilized to compare the airtime of Cat B (assume SISO) versus a Cat A (MIMO) relay. Assume: payload size P=1500 bytes; header plus preamble duration for SC transmission=2.37 µs. It is assumed the MIMO AP and Relay provide K=2 degrees of freedom in the spatial dimension (i.e., ideally this link can double the data rate compared to a link with SISO STAs).

X1: RSSI at STA 4 due to signal transmitted from AP=−53.5 dBm; then MCS(X1)=11 and Z1=3850 Mbps.

X2: RSSI at STA 3 due to signal transmitted from AP=−56 dBm; then MCS(X1)=10 and Z2=K*3080=2*3080=6160.

X3: RSSI at STA 1 due to signal transmitted from STA 4=−53.5 dBm, then MCS(X1)=11 and Z3=3850 Mbps X4: RSSI at STA 2 due to signal transmitted from STA 4=−53.5 dBm, then MCS (X1)=11 and Z4=3850 Mbps.

X5: RSSI at STA 1 due to signal transmitted from STA 3=−63 dBm, then MCS(X1)=6 and Z5=1540 Mbps.

X6: RSSI at STA 1 due to signal transmitted from STA 3=−60 dBm, then MCS(X1)=8 and Z6=2310 Mbps.

End-to-End Payload airtime estimation for SISO Relay:

$$4*2.37+1500*8((1/3850)+(1/3850)+(1/3850)+(1/3850))=21.95 \text{ µs}$$

End-to-End Payload airtime estimation for MIMO Relay: $2*2.37+1500*8((1/6160)+(1/1540))=14.5$ µs, where for MU-MIMO link from STA 3 to STA 1 and to STA 2, the airtime is dominated by the worst link rate. So in this case (FIG. 22), the relay selection logic decides to use the Cat A relay as it provides around 34% reduction in air-time.

A number of additional elements should be considered about the above described embodiment. The relaying decision logic resides within the system control point, such as the AP. No direct communication, and hence no BF training, is required between candidate relay(s) and STAs for the initial relay selection decision, which saves substantial airtime; the amount of which is proportional to the number of possible relays in the network. This method of making relaying decisions is proactive as the decision is made before the start of the data transmission interval (DTI). The descriptions provide examples of the logic used to group STAs and to pick the relay terminal from which one can create algorithms according to the desired application. The designer can also determine their own specific algorithms for utilizing a combination of the aforementioned metrics For example, if the AP determines that the angles of arrival of the candidate relay with respect to each of the relayed STAs overlap, a high level of MU-M IMO interference can arise prevent this candidate relay terminal from being selected.

The embodiments of this current disclosure take advantage of M IMO communications in wireless systems and proactive relay selection to propose a practical and spectrally-efficient relaying of data in a wireless system.

The present disclosure provides a number of benefits over current wireless systems. The disclosed system is proactive as its starts the relay selection process before source transmission, whereas in previous systems relay selection started only after a link failure arises. The disclosed system is efficient in using messaging and BF training frames for relay selection, and not from dedicated predetermined messaging metrics as in prior systems. The disclosed system is predictive in nature as its runs relay selection logic using input metrics without dedicated channel measurement between each candidate relay and source/destination; whereas prior systems operated in a response only mode to select a relay after exchanging dedicated channel measurements between each candidate relay and source/destination. The disclosed system is more efficient in regard to sending superframes as it schedules relaying SP only for data transfer with the selected relay, and not before relay selection with each candidate relay, and then later scheduling SP for an actual data transfer with the selected relay.

The enhancements described in the presented technology can be readily implemented within various wireless system technologies and protocols (standards). It should also be appreciated that wireless radio nodes are preferably implemented to include one or more computer processor devices (e.g., CPU, microprocessor, microcontroller, computer enabled ASIC, etc.) and associated memory storing instructions (e.g., RAM, DRAM, NVRAM, FLASH, computer readable media, etc.) whereby programming (instructions) stored in the memory are executed on the processor to perform the steps of the various process methods described herein.

The computer and memory devices were not depicted in the diagrams for the sake of simplicity of illustration, as one of ordinary skill in the art recognizes the use of processor based circuitry for carrying out steps involved with wireless radio communications. The presented technology is non-limiting with regard to memory and computer-readable media, insofar as these are non-transitory, and thus not constituting a transitory electronic signal.

Embodiments of the present technology may be described herein with reference to flowchart illustrations of methods and systems according to embodiments of the technology, and/or procedures, algorithms, steps, operations, formulae, or other computational depictions, which may also be implemented as computer program products. In this regard, each block or step of a flowchart, and combinations of blocks (and/or steps) in a flowchart, as well as any procedure, algorithm, step, operation, formula, or computational depiction can be implemented by various means, such as hardware, firmware, and/or software including one or more computer program instructions embodied in computer-readable program code. As will be appreciated, any such computer program instructions may be executed by one or more computer processors, including without limitation a general purpose computer or special purpose computer, or other programmable processing apparatus to produce a machine, such that the computer program instructions which execute on the computer processor(s) or other programmable processing apparatus create means for implementing the function(s) specified.

Accordingly, blocks of the flowcharts, and procedures, algorithms, steps, operations, formulae, or computational depictions described herein support combinations of means for performing the specified function(s), combinations of steps for performing the specified function(s), and computer program instructions, such as embodied in computer-readable program code logic means, for performing the specified function(s). It will also be understood that each block of the flowchart illustrations, as well as any procedures, algorithms, steps, operations, formulae, or computational depictions and combinations thereof described herein, can be implemented by special purpose hardware-based computer systems which perform the specified function(s) or step(s), or combinations of special purpose hardware and computer-readable program code.

Furthermore, these computer program instructions, such as embodied in computer-readable program code, may also be stored in one or more computer-readable memory or memory devices that can direct a computer processor or other programmable processing apparatus to function in a particular manner, such that the instructions stored in the computer-readable memory or memory devices produce an article of manufacture including instruction means which implement the function specified in the block(s) of the flowchart(s). The computer program instructions may also be executed by a computer processor or other programmable processing apparatus to cause a series of operational steps to be performed on the computer processor or other programmable processing apparatus to produce a computer-implemented process such that the instructions which execute on the computer processor or other programmable processing apparatus provide steps for implementing the functions specified in the block(s) of the flowchart(s), procedure (s) algorithm(s), step(s), operation(s), formula(e), or computational depiction(s).

It will further be appreciated that the terms "programming" or "program executable" as used herein refer to one or more instructions that can be executed by one or more computer processors to perform one or more functions as described herein. The instructions can be embodied in software, in firmware, or in a combination of software and firmware. The instructions can be stored local to the device in non-transitory media, or can be stored remotely such as on a server, or all or a portion of the instructions can be stored locally and remotely. Instructions stored remotely can be downloaded (pushed) to the device by user initiation, or automatically based on one or more factors.

It will further be appreciated that as used herein, that the terms processor, computer processor, central processing unit (CPU), and computer are used synonymously to denote a device capable of executing the instructions and communicating with input/output interfaces and/or peripheral devices, and that the terms processor, computer processor, CPU, and computer are intended to encompass single or multiple devices, single core and multicore devices, and variations thereof.

From the description herein, it will be appreciated that that the present disclosure encompasses multiple embodiments which include, but are not limited to, the following:

1. A wireless communication system providing directional transmission for relaying data between multiple communication devices, comprising: (a) at least one central radio coordinator node on said system; (b) multiple radio nodes on said system; (c) wherein each said radio node, of said multiple radio nodes, provides either a first level or second level of signal processing capability for communicating between each of said radio nodes; (d) wherein said central coordinator radio node performs selection of one of said plurality of radio nodes as a relay node between two or more of said radio nodes in said system based on their level of signal processing capability and on communication characteristics between said multiple radio nodes and said central radio coordinator; (e) wherein data communication is performed between the central coordinator radio node configured for multiple-input-multiple-output (MIMO) communications and two or more radio nodes through the relay node in response to making a MIMO hop from said central coordinator radio node to the relay node, followed by a multi-user (MU) MIMO hop from the relay node to two or more radio nodes as clients.

2. A wireless communication system with directional transmission configured for relaying communications between multiple communication devices, comprising: (a) at least one central radio coordinator configured for multiple-input-multiple-output (MIMO) communications on said system; and (b) multiple radio nodes on said system, wherein each radio node provides either a first level or second level of signal processing capability for communicating between each of said radio nodes; (c) wherein said central radio coordinator performs selection of one of said plurality of radio nodes as a relay node between two or more radio nodes in said system; (d) wherein said central radio coordinator makes a selection of relay node prior to data transmission based on level of signal processing capability of the nodes and existing communication characteristics; and (e) wherein two or more said communication characteristic are selected from a group of characteristics consisting of signal strength measurements, relaying capability, angle-of-arrival (AoA)/angle-of-departure (AoD), and presence of AC or DC power.

3. A wireless network apparatus configured for simultaneously relaying communications between multiple radio nodes, comprising: (a) a central coordinator radio node which is configured for multiple-input-multiple-output (MIMO) communications over a wireless network communicating with wireless radio nodes which include at least one access point (AP); (b) wherein said wireless radio nodes comprise a combination of first category radio nodes and second category radio nodes, in which the first category nodes support multiple-input-multiple-output (MIMO) communications, and in which the second category radio nodes do not support MIMO; (c) wherein said central coordinator radio node performs selection of one of said radio nodes as a relay node between at least one said AP and any one of said radio nodes based on communication characteristics, including category of radio node, signal strength and estimated air time; (d) wherein said AP utilizes a relaying service period (SP) within a superframe structure which contains multiple training and data transmission frames; (e) wherein said AP initiates a simultaneous relay link setup (RLS) process with two or more of said plurality of radio nodes toward decreasing RLS messaging overhead; (f) wherein data communications is performed between the AP and a destination radio node through the relay node in response to making a MIMO hop from said AP to the relay node, followed by a multi-user (MU) MIMO hop from the relay node and a destination radio node (client).

4. The apparatus of any preceding embodiment, wherein said second category radio nodes are configured to support only two independent chains of data communication, or to support only one chain in a single-input-single-output (SISO) communication.

5. The apparatus of any preceding embodiment, wherein a radio node is selected by the central coordinator as a relay node prior to a data communication session with the destination radio node (client).

6. The apparatus of any preceding embodiment, wherein a management frame is utilized during a beacon header interval (BHI) which controls use of MIMO capability.

7. The apparatus of any preceding embodiment, wherein said management frames convey MIMO device capabilities in an information element (IE) format.

8. The apparatus of any preceding embodiment, wherein said communication characteristic of signal strength are selected from the signal strength measurements of receive signal strength indicator (RSSI) and signal-to-noise ratio (SNR).

9. The apparatus of any preceding embodiment, wherein said communication characteristic further comprise metrics one or more metrics selected from the group of characteristics consisting of (a) Cat A/Cat B capability; (b) relaying capability; (c) angle-of-arrival (AoA)/angle-of-departure (AoD); and (d) presence of AC or DC power.

10. The apparatus of any preceding embodiment, wherein fields in said relaying service period (SP) comprise: (a) beamforming (BF) refinement between AP and the relay; (b) a channel state information metric is fed back by the relay for MIMO operation; (c) BF training is performed between the relay and a first station (STA 1) including Tx and Rx sector training; (d) BF training is performed between the relay and a second station (STA 2) including Tx and Rx sector training; (e) a probing sequence is performed from the relay to STA 1; (f) a channel state information metric is fed back by STA 1; (g) a probing sequence is performed from the relay to STA 2; (h) a channel state information metric is fed back by STA 2; (i) simultaneous pilot transmissions are performed by STA 1 and STA 2 for inter-user interference estimation by the relay; (j) data is transmitted between the AP and the relay using MIMO; and (k) data is transmitted from the relay to STA 1 and STA 2 using multiple-user (MU) MIMO.

11. The apparatus of any preceding embodiment, wherein said central coordinator radio node is implemented within said at least one access point (AP) radio node.

12. A method for implementing a wireless network apparatus configured for simultaneously relaying communications between multiple radio nodes on the network, comprising the steps of: (a) configuring a plurality of radio nodes as a combination of a first category which supports multiple-input-multiple-output (MIMO) communications, and a second category which does not support MIMO communications; (b) wherein at least one of said radio nodes is an Access Point (AP) configured as a first category of radio node for MIMO communication; (c) selecting a radio node as a relay node between said AP and any one of said radio nodes based on communication characteristics, which include signal strength and air time considerations, whereby first category radio nodes have an increased probability of selection since they consume less air time because of their multiplexed communications than said second category of radio nodes; (d) relaying is performed in response to a MIMO hop from the AP to the relay, followed by a multi-user (MU) MIMO hop from the relay node to said radio node which is the destination (client); and (e) modifying relaying service period (SP) within a superframe structure utilized in said method to contain multiple training and data transmission frames; and (f) wherein MIMO capability of radio nodes is exploited to provide spectrally-efficient relaying between radio nodes and the AP.

13. The method of any preceding embodiment, wherein a radio node is selected as a relay node prior to a data communication session.

14. The method of any preceding embodiment, further comprising utilizing management frames during a beacon header interval (BHI) which controls use of MIMO capability.

15. The method of any preceding embodiment, wherein said management frames convey MIMO device capabilities in an information element (IE) format.

16. The method of any preceding embodiment, wherein said communication characteristic of signal strength are selected from the signal strength measurements of receive signal strength indicator (RSSI) and signal-to-noise ratio (SNR).

17. The method of any preceding embodiment, wherein said communication characteristic further comprise one or more metrics selected from the group of characteristics consisting of (a) category of radio node; (b) relaying capability; (c) angle-of-arrival (AoA)/angle-of-departure (AoD); and (d) presence of AC or DC power.

18. The method of any preceding embodiment, wherein fields in said relaying service period (SP) comprise: (a) beamforming (BF) refinement between AP and the relay; (b) a channel state information metric is fed back by the relay for MIMO operation; (c) BF training is performed between the relay and a first station (STA 1) including Tx and Rx sector training; (d) BF training is performed between the relay and a second station (STA 2) including Tx and Rx sector training; (e) a probing sequence is performed from the relay to STA 1; (f) a channel state information metric is fed back by STA 1; (g) a probing sequence is performed from the relay to STA 2; (h) a channel state information metric is fed back by STA 2; (i) simultaneous pilot transmissions are performed by STA 1 and STA 2 for inter-user interference estimation by the relay; (j) data is transmitted between the AP and the relay using MIMO; and (k) data is transmitted from the relay to STA 1 and STA 2 using multiple-user (MU) MIMO.

19. A wireless Access Point (AP) apparatus for a wireless network configured for simultaneously relaying communications between multiple radio nodes on the network, comprising: (a) an access point (AP) configured for performing simultaneous communications using multiple-input-multiple-output (MIMO) capability to communicate with a plurality of radio nodes in the network of a first category which support MIMO, or a second category which does not support MIMO; (b) a computer processor in said AP; (c) a non-transitory computer-readable memory storing instructions executable by said computer processor in said AP; (d) wherein said instructions, when executed by the computer processor, perform steps comprising: (d)(i) selecting a relay device from said plurality of radio nodes based on at least signal strength metrics and an estimation of air time requirements; (d)(ii) utilizing a relaying service period (SP) within a superframe structure which contain multiple training and data transmission frames; (d)(iii) performing relay link setup (RLS) to two or more radio nodes simultaneously which decreases the RLS messaging overhead; and (e) relaying data communications in response to a MIMO hop from said AP to the selected relay device, followed by a multi-user (MU) MIMO hop from the selected relay device and a destination radio node (client).

20. The apparatus of any preceding embodiment, wherein a radio node is selected by the AP as a relay node prior to a data communication session with the destination radio node (client).

21. The apparatus of any preceding embodiment, wherein a management frame is utilized during a beacon header interval (BHI) which controls use of MIMO capability.

22. The apparatus of any preceding embodiment, wherein said management frames convey MIMO device capabilities in an information element (IE) format.

23. The apparatus of any preceding embodiment, wherein said communication characteristic of signal strength are selected from the signal strength measurements of receive signal strength indicator (RSSI) and signal-to-noise ratio (SNR).

24. The apparatus of any preceding embodiment, wherein said communication characteristic further comprise metrics one or more metrics selected from the group of characteristics consisting of (a) first or second category capability; (b) relaying capability; (c) angle-of-arrival (AoA)/angle-of-departure (AoD); and (d) presence of AC or DC power.

25. The apparatus of any preceding embodiment, wherein fields in said relaying service period (SP) comprise: (a) beamforming (BF) refinement between AP and the relay; (b) a channel state information metric is fed back by the relay for MIMO operation; (c) BF training is performed between the relay and a first station (STA 1) including Tx and Rx sector training; (d) BF training is performed between the relay and a second station (STA 2) including Tx and Rx sector training; (e) a probing sequence is performed from the relay to STA 1; (f) a channel state information metric is fed back by STA 1; (g) a probing sequence is performed from the relay to STA 2; (h) a channel state information metric is fed back by STA 2; (i) simultaneous pilot transmissions are performed by STA 1 and STA 2 for inter-user interference estimation by the relay; (j) data is transmitted between the AP and the relay using MIMO; and (k) data is transmitted from the relay to STA 1 and STA 2 using multiple-user (MU) MIMO.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

In the claims, reference to an element in the singular is not intended to mean "one and only one" unless explicitly so stated, but rather "one or more." All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

TABLE 1

Example of Selecting X, Y and Z threshold values

| Symbol | Description | Value | Reason |
|---|---|---|---|
| X | RSSI threshold at a STA below which relaying is considered | −65 dBm | * MCS1, MCS2 have limited data rate<br>* Link margin limited to few dBs after which outage can occur<br>* Refer to Tables 2 and 3 |
| Y | RSSI differential for relay search range from reference point | 3 dBm | Around 10% of relay RSSI if relay is at a central location between AP and a STA with RSSI of −60 dBm |
| Z | AoD differential for relay search from reference point | 22.5° | Provides 45° spatial search range for a relay with respect to line-of-sight between AP and the STA that needs assistance in communications |

TABLE 2

802.11ad Receiver Sensitivity

| MCS Index | Receive Sensitivity (dBm) |
|---|---|
| 0 | −78 |
| 1 | −68 |
| 2 | −66 |
| 3 | −65 |
| 4 | −64 |
| 5 | −62 |
| 6 | −63 |
| 7 | −62 |
| 8 | −61 |
| 9 | −59 |
| 10 | −55 |
| 11 | −54 |
| 12 | −53 |

TABLE 3

802.11ad Modulation and Coding Scheme for SC

| MCS Index | Modulation ($\frac{\pi}{2}$ form) | $N_{CBPS}$ | Code Rate | Data Rate (Mbps) |
|---|---|---|---|---|
| 1 | BPSK | 1 | 1/2 | 385 |
| 2 | BPSK | 1 | 1/2 | 770 |
| 3 | BPSK | 1 | 5/8 | 962.5 |
| 4 | BPSK | 1 | 3/4 | 1155 |
| 5 | BPSK | 1 | 13/16 | 1251.25 |
| 6 | QPSK | 2 | 1/2 | 1540 |
| 7 | QPSK | 2 | 5/8 | 1925 |
| 8 | QPSK | 2 | 3/4 | 2310 |
| 9 | QPSK | 2 | 13/16 | 2502.5 |
| 10 | 16QAM | 4 | 1/2 | 3080 |
| 11 | 16QAM | 4 | 5/8 | 3850 |
| 12 | 16QAM | 4 | 3/4 | 4620 |

Note Repetition is 2 for an MCS index of 1, and 1 for remaining indices

What is claimed is:

1. A wireless network apparatus configured for simultaneously relaying communications between multiple wireless radio nodes, comprising:

a central coordinator radio node which is configured for multiple-input-multiple-output (MIMO) communications over a wireless network communicating with the multiple wireless radio nodes which include at least one access point (AP);

wherein said wireless radio nodes comprise a combination of first category radio nodes and second category radio nodes, in which the first category nodes support multiple-input-multiple-output (MIMO) communications, and in which the second category radio nodes do not support MIMO;

wherein said central coordinator radio node performs selection of one of said radio nodes within said multiple wireless radio nodes as a relay node between at least one said AP and any one of said radio nodes within said multiple wireless radio nodes based on communication characteristics, including category of radio node, signal strength and estimated air time;

wherein said AP utilizes a relaying service period (SP) within a superframe structure which contains multiple training and data transmission frames;

wherein said AP initiates a simultaneous relay link setup (RLS) process with two or more of said plurality of radio nodes within said multiple wireless radio nodes toward decreasing RLS messaging overhead;

wherein data communications is performed between the AP and a destination radio node through the selected relay node in response to making a MIMO hop from said AP to the selected relay node, followed by a multi-user (MU) MIMO hop from the selected relay node and the destination radio node; and wherein fields in said relaying service period (SP) comprise: (a) beamforming (BF) refinement between AP and the relay node; (b) a channel state information metric is fed back by the relay node for MIMO operation; (c) BF training is performed between the relay node and a first station (STA 1) including transmitter (Tx) and receiver (Rx) sector training; (d) BF training is performed between the relay node and a second station (STA 2) including Tx and Rx sector training; (e) a probing sequence is performed from the relay node to STA 1; (f) a channel state information metric is fed back by STA 1; (g) a probing sequence is performed from the relay node to STA 2; (h) a channel state information metric is fed back by STA 2; (i) simultaneous pilot transmissions are performed by STA 1 and STA 2 for inter-user interference estimation by the relay; (j) data is transmitted between the AP and the relay node using MIMO; and (k) data is transmitted from the relay node to STA 1 and STA 2 using multiple-user (MU) MIMO.

2. The apparatus as recited in claim 1, wherein said second category radio nodes are configured to support only two independent chains of data communication, or to support only one chain in a single-input-single-output (SISO) communication.

3. The apparatus as recited in claim 1, wherein a radio node is selected by the central coordinator as a relay node prior to a data communication session with the destination radio node.

4. The apparatus as recited in claim 1, wherein a management frame is utilized during a beacon header interval (BHI) which controls use of MIMO capability.

5. The apparatus as recited in claim 4, wherein said management frame convey MIMO device capabilities in an information element (IE) format.

6. The apparatus as recited in claim 1, wherein said communication characteristics of signal strength are selected from signal strength measurements of receive signal strength indicator (RSSI) and signal-to-noise ratio (SNR).

7. The apparatus as recited in claim 1, wherein said communication characteristics further comprise one or more metrics selected from the group of characteristics consisting of (a) Cat A/Cat B capability; (b) relaying capability; (c) angle-of-arrival (AoA)/angle-of-departure (AoD); and (d) presence of AC or DC power.

8. The apparatus as recited in claim 1, wherein said central coordinator radio node is implemented within said at least one access point (AP) radio node.

9. A method for implementing a wireless network apparatus configured for simultaneously relaying communications between multiple wireless radio nodes on the network, comprising the steps of:

configuring the multiple wireless radio nodes as a combination of a first category of radio nodes which supports multiple-input-multiple-output (MIMO) communications, and a second category of radio nodes which does not support MIMO communications;

wherein at least one of said radio nodes is an Access Point (AP) configured as a first category of radio nodes for MIMO communication;

selecting a radio node as a relay node between said AP and any one of said radio nodes, within the multiple wireless radio nodes, based on communication characteristics, which include signal strength and air time considerations, whereby said first category radio nodes have an increased probability of selection since they consume less air time because of their multiplexed communications than said second category of radio nodes;

relaying is performed in response to a MIMO hop from the AP to the selected relay node, followed by a multi-user (MU) MIMO hop from the relay node to said radio node which is a destination radio node (client); and modifying relaying service period (SP) within a superframe structure utilized in said method to contain multiple training and data transmission frames;

wherein MIMO capability of radio nodes is exploited to provide spectrally-efficient relaying between radio nodes and the AP; and wherein fields in said relaying service period (SP) comprise: (a) beamforming (BF) refinement between AP and the relay node; (b) a channel state information metric is fed back by the relay node for MIMO operation; (c) BF training is performed between the relay node and a first station (STA 1) including transmitter (Tx) and receiver (Rx) sector training; (d) BF training is performed between the relay node and a second station (STA 2) including Tx and Rx sector training; (e) a probing sequence is performed from the relay node to STA 1; (f) a channel state information metric is fed back by STA 1; (q) a probing sequence is performed from the relay node to STA 2; (h) a channel state information metric is fed back by STA 2; (i) simultaneous pilot transmissions are performed by STA 1 and STA 2 for inter-user interference estimation by the relay node; (j) data is transmitted between the AP and the relay node using MIMO; and (k) data is transmitted from the relay node to STA 1 and STA 2 using multiple-user (MU) MIMO.

10. The method as recited in claim 9, wherein a radio node is selected as a relay node prior to a data communication session.

11. The method as recited in claim 9, further comprising utilizing management frames during a beacon header interval (BHI) which controls use of MIMO capability.

12. The method as recited in claim 9, wherein said management frames convey MIMO device capabilities in an information element (IE) format.

13. The method as recited in claim 9, wherein said communication characteristic of signal strength are selected from the signal strength measurements of receive signal strength indicator (RSSI) and signal-to-noise ratio (SNR).

14. The method as recited in claim 9, wherein said communication characteristics further comprise one or more metrics selected from the group of characteristics consisting of (a) category of radio node; (b) relaying capability; (c) angle-of-arrival (AoA)/angle-of-departure (AoD); and (d) presence of AC or DC power.

15. A wireless Access Point (AP) apparatus for a wireless network configured for simultaneously relaying communications between multiple wireless radio nodes on the network, comprising:

(a) an access point (AP) configured for performing simultaneous communications using multiple-input-multiple-output (MIMO) capability to communicate in the network of the multiple wireless radio nodes with a first category of radio nodes which support MIMO, or a second category of radio nodes which does not support MIMO;
(b) a computer processor in said AP;
(c) a non-transitory computer-readable memory storing instructions executable by said computer processor in said AP;
(d) wherein said instructions, when executed by the computer processor, perform steps comprising:
  (i) selecting a relay device from the multiple wireless radio nodes based on at least signal strength metrics and an estimation of air time requirements;
  (ii) utilizing a relaying service period (SP) within a superframe structure which contain multiple training and data transmission frames;
  (iii) performing relay link setup (RLS) to two or more radio nodes within the multiple wireless radio nodes simultaneously which decreases RLS messaging overhead;
(e) relaying data communications in response to a MIMO hop from said AP to the selected relay device, followed by a multi-user (MU) MIMO hop from the selected relay device and a destination radio node (client); and
(f) wherein fields in said relaying service period (SP) comprise: (a) beamforming (BF) refinement between AP and the relay node; (b) a channel state information metric is fed back by the relay node for MIMO operation; (c) BF training is performed between the relay node and a first station (STA 1) including transmitter (Tx) and receiver (Rx) sector training; (d) BF training is performed between the relay node and a second station (STA 2) including Tx and Rx sector training; (e) a probing sequence is performed from the relay node to STA 1; (f) a channel state information metric is fed back by STA 1; (q) a probing sequence is performed from the relay node to STA 2; (h) a channel state information metric is fed back by STA 2; (i) simultaneous pilot transmissions are performed by STA 1 and STA 2 for inter-user interference estimation by the relay node; (j) data is transmitted between the AP and the relay node using MIMO; and (k) data is transmitted from the relay node to STA 1 and STA 2 using multiple-user (MU) MIMO.

16. The apparatus as recited in claim 15, wherein a radio node is selected by the AP as a relay node prior to a data communication session with the destination radio node (client).

17. The apparatus as recited in claim 15, wherein a management frame is utilized during a beacon header interval (BHI) which controls use of MIMO capability.

18. The apparatus as recited in claim 17, wherein said management frame convey MIMO device capabilities in an information element (IE) format.

19. The apparatus as recited in claim 15, wherein said signal strength metrics are selected from the signal strength measurements of receive signal strength indicator (RSSI) and signal-to-noise ratio (SNR).

20. The apparatus as recited in claim 15, wherein said selecting a relay device from the multiple wireless radio nodes is performed in response to one or more metrics selected from the group of characteristics consisting of (a) first or second category capability; (b) relaying capability; (c) angle-of-arrival (AoA)/angle-of-departure (AoD); and (d) presence of AC or DC power.

* * * * *